United States Patent
Lee et al.

(10) Patent No.: US 12,137,479 B2
(45) Date of Patent: Nov. 5, 2024

(54) METHOD AND APPARATUS FOR COVERAGE ENHANCEMENT OF TERMINAL IN COMMUNICATION SYSTEM

(71) Applicant: ELECTRONICS AND TELECOMMUNICATIONS RESEARCH INSTITUTE, Daejeon (KR)

(72) Inventors: Jung Hoon Lee, Daejeon (KR); Jae Heung Kim, Daejeon (KR); Sung Cheol Chang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 389 days.

(21) Appl. No.: 17/538,907

(22) Filed: Nov. 30, 2021

(65) Prior Publication Data

US 2022/0174745 A1 Jun. 2, 2022

(30) Foreign Application Priority Data

| Dec. 2, 2020 | (KR) | 10-2020-0167014 |
| Feb. 8, 2021 | (KR) | 10-2021-0017859 |
| Sep. 14, 2021 | (KR) | 10-2021-0122740 |
| Nov. 22, 2021 | (KR) | 10-2021-0161055 |

(51) Int. Cl.
*H04W 74/0833* (2024.01)
(52) U.S. Cl.
CPC .............. *H04W 74/0833* (2013.01)
(58) Field of Classification Search
CPC .............. H04W 74/0833; H04W 74/006
See application file for complete search history.

(56) References Cited

U.S. PATENT DOCUMENTS

| 9,380,599 B2 | 6/2016 | Park et al. |
| 10,749,640 B2 | 8/2020 | Kim et al. |
| 2020/0008235 A1 | 1/2020 | Sarkis et al. |
| 2020/0275496 A1 | 8/2020 | Stern-Berkowitz et al. |
| 2020/0413412 A1* | 12/2020 | Kim ............ H04W 24/08 |

(Continued)

FOREIGN PATENT DOCUMENTS

| EP | 3082366 A1 | 10/2016 | |
| EP | 4132195 A1 * | 2/2023 | ........... H04L 67/04 |

(Continued)

OTHER PUBLICATIONS

Machine translated version of patent KR-20230044489-A1 retrieved from PE2E on Feb. 15, 2023 (Year: 2020).*

*Primary Examiner* — Charles C Jiang
*Assistant Examiner* — Rachel Elizabeth Marks
(74) *Attorney, Agent, or Firm* — Rabin & Berdo, P.C.

(57) ABSTRACT

An operation method of a base station in a communication system may comprise: generating first RACH configuration information for a normal terminal; generating second RACH configuration information for a RedCap terminal; transmitting a message including the first RACH configuration information and the second RACH configuration information; and performing a random access procedure with a first terminal based on the message, wherein a terminal type of the first terminal is identified based on the first RACH configuration information and the second RACH configuration information, and the terminal type is the normal terminal or the RedCap terminal.

10 Claims, 10 Drawing Sheets

(56) References Cited

U.S. PATENT DOCUMENTS

| | | | |
|---|---|---|---|
| 2021/0029678 A1 | 1/2021 | Liu et al. | |
| 2021/0037573 A1* | 2/2021 | Ly | H04W 72/23 |
| 2022/0408292 A1* | 12/2022 | He | H04L 5/0091 |
| 2023/0422296 A1* | 12/2023 | Feng | H04W 74/02 |

FOREIGN PATENT DOCUMENTS

| | | | | |
|---|---|---|---|---|
| KR | 20230044489 A1 * | 4/2023 | | H04W 74/00 |
| WO | 2020045935 A1 | 3/2020 | | |

* cited by examiner

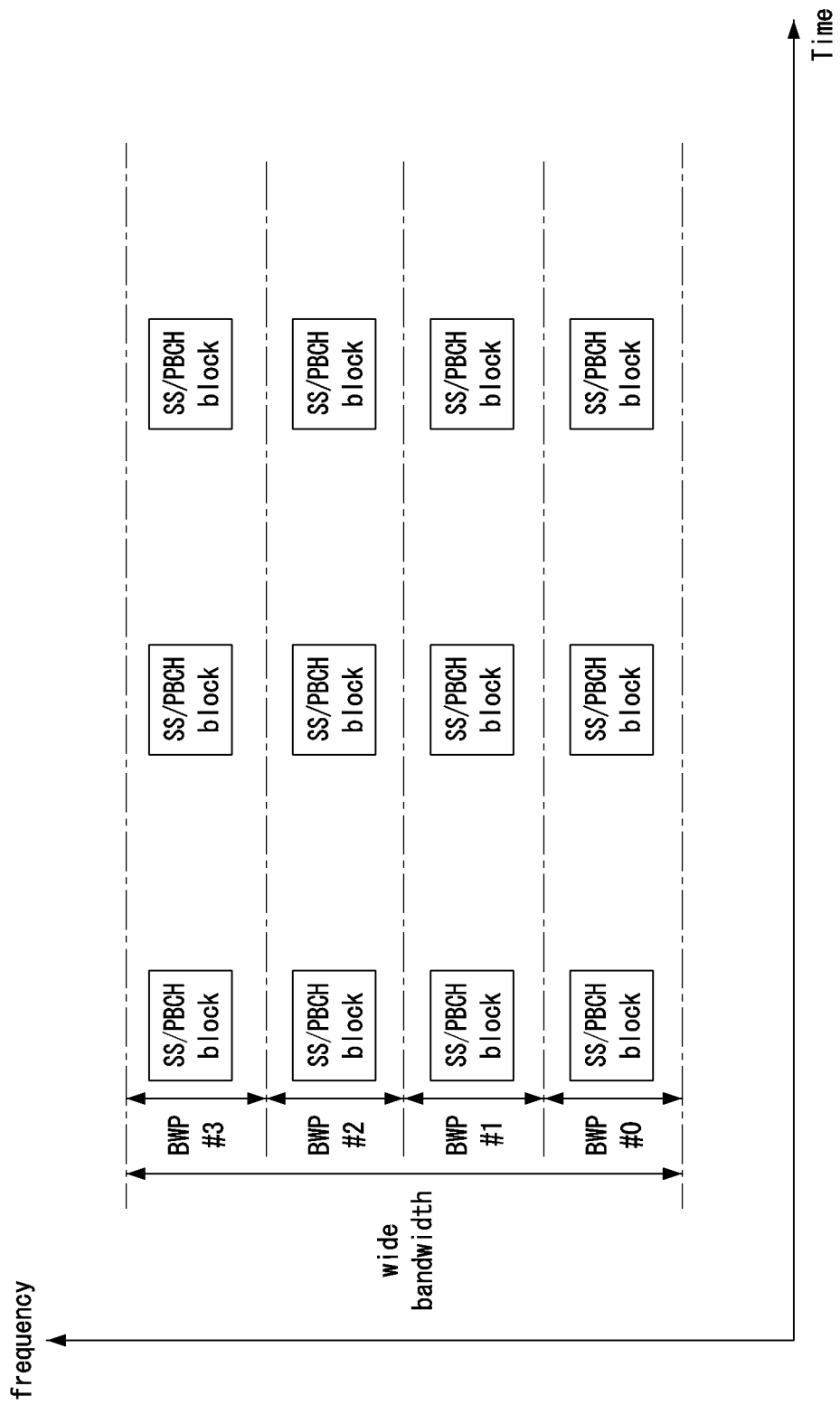

RMSI CORESET mapping pattern #1

RMSI CORESET mapping pattern #2

RMSI CORESET mapping pattern #3

METHOD AND APPARATUS FOR COVERAGE ENHANCEMENT OF TERMINAL IN COMMUNICATION SYSTEM

CROSS-REFERENCE TO RELATED APPLICATIONS

This application claims priority to Korean Patent Applications No. 10-2020-0167014 filed on Dec. 2, 2020, No. 10-2021-0017859 filed on Feb. 8, 2021, No. 10-2021-0122740 filed on Sep. 14, 2021, and No. 10-2021-0161055 filed on Nov. 22, 2021 with the Korean Intellectual Property Office (KIPO), the entire contents of which are hereby incorporated by reference.

BACKGROUND

1. Technical Field

The present disclosure relates to a terminal coverage enhancement technique in a communication system, and more particularly, to a technique of coverage enhancement for a terminal having reduced capability.

2. Related Art

The communication system (e.g., a new radio (NR) communication system) using a higher frequency band (e.g., a frequency band of 6 GHz or above) than a frequency band (e.g., a frequency band of 6 GHz or below) of the long term evolution (LTE) communication system (or, LTE-A communication system) is being considered for processing of soaring wireless data. The NR system may support not only a frequency band of 6 GHz or below, but also a frequency band of 6 GHz or above, and may support various communication services and scenarios compared to the LTE system. In addition, requirements of the NR system may include enhanced Mobile BroadBand (eMBB), Ultra Reliable Low Latency Communication (URLLC), and Massive Machine Type Communication (mMTC).

Meanwhile, a terminal (hereinafter, referred to as a 'RedCap terminal') having reduced capability may be introduced in a communication system. The maximum carrier bandwidth and the number of reception antennas for the RedCap terminal may be reduced compared to the conventional (i.e., legacy) terminal, and thus the coverage of the RedCap terminal may be reduced. Therefore, there is a need for methods for improving the coverage of the RedCap terminal. In addition, the RedCap terminals and the normal terminals may perform random access procedures, and methods for distinguishing the RedCap terminals from the normal terminals in the random access procedures are required.

SUMMARY

Accordingly, exemplary embodiments of the present disclosure are directed to providing methods and apparatuses for enhancing a coverage of a terminal having reduced capability.

According to a first exemplary embodiment of the present disclosure, an operation method of a base station in a communication system may comprise: generating first random access channel (RACH) configuration information for a normal terminal; generating second RACH configuration information for a reduced capability (RedCap) terminal; transmitting a message including the first RACH configuration information and the second RACH configuration information; and performing a random access procedure with a first terminal based on the message, wherein a terminal type of the first terminal is identified based on the first RACH configuration information and the second RACH configuration information, and the terminal type is the normal terminal or the RedCap terminal.

The first RACH configuration information may include configuration information of a first physical random access channel (PRACH) preamble for the normal terminal, the second RACH configuration information may include configuration information of a second PRACH preamble for the RedCap terminal, the terminal type may be identified based on a type of a PRACH preamble received in the random access procedure, and the type of the PRACH preamble may be the first PRACH preamble or the second PRACH preamble.

The first RACH configuration information may include configuration information of a first RACH occasion (RO) for the normal terminal, the second RACH configuration information may include configuration information of a second RO for the RedCap terminal, the terminal type may be identified based on a type of an RO in which a PRACH preamble is received in the random access procedure, and the type of the RO may be the first RO or the second RO.

Information for enabling or disabling an operation of distinguishing the normal terminal from the RedCap terminal based on the first RACH configuration information and the second RACH configuration information may be included in the message.

Information indicating whether at least one of a type-1 random access procedure or a type-2 random access procedure is supported may be included in the message.

The performing of the random access procedure may comprise: receiving a Msg1 from the first terminal; transmitting a Msg2 to the first terminal in response to the Msg1; receiving a Msg3 from the first terminal; and identifying the terminal type as the normal terminal or the RedCap terminal based on an indicator included in the Msg3.

Information for enabling or disabling an operation of distinguishing the normal terminal from the RedCap terminal based on the indicator may be included in the message.

The performing of the random access procedure may comprise: receiving a MsgA including a PRACH preamble and a physical uplink shared channel (PUSCH) from the first terminal; and identifying the terminal type as the normal terminal or the RedCap terminal based on a transmission resource of the PUSCH.

The performing of the random access procedure may comprise: receiving a MsgA including a PRACH preamble and a PUSCH from the first terminal; and identifying the terminal type as the normal terminal or the RedCap terminal based on an indicator included in the PUSCH.

The performing of the random access procedure may comprise: receiving a PRACH preamble from the first terminal that is the RedCap terminal; calculating a second radio network temporary identifier (RNTI) based on a transmission resource of the PRACH preamble; and transmitting downlink control information (DCI) scrambled by the second RNTI to the RedCap terminal, wherein a value of the second RNTI is a result of a second equation obtained by applying an offset to a first equation for calculating a first RNTI of the normal terminal.

The offset may be 14×80×8×4.

A modulo operation may be applied to the second equation, so as to prevent the value of the second RNTI from exceeding from a preset range due to the offset.

The second RNTI may be a random access (RA)-R-RNTI for a type-1 random access procedure or an MSGB-R-RNTI for a type-2 random access procedure.

According to a second exemplary embodiment of the present disclosure, a base station in a communication system may comprise: a processor; a memory electronically communicating with the processor; instructions stored in the memory, wherein when executed by the processor, the instructions cause the base station to: generate first random access channel (RACH) configuration information for a normal terminal; generate second RACH configuration information for a reduced capability (RedCap) terminal; transmit a message including the first RACH configuration information and the second RACH configuration information; and perform a random access procedure with a first terminal based on the message, wherein a terminal type of the first terminal is identified based on the first RACH configuration information and the second RACH configuration information, and the terminal type is the normal terminal or the RedCap terminal.

The first RACH configuration information may include configuration information of a first physical random access channel (PRACH) preamble for the normal terminal, the second RACH configuration information may include configuration information of a second PRACH preamble for the RedCap terminal, the terminal type may be identified based on a type of a PRACH preamble received in the random access procedure, and the type of the PRACH preamble may be the first PRACH preamble or the second PRACH preamble.

The first RACH configuration information may include configuration information of a first RACH occasion (RO) for the normal terminal, the second RACH configuration information may include configuration information of a second RO for the RedCap terminal, the terminal type may be identified based on a type of an RO in which a PRACH preamble is received in the random access procedure, and the type of the RO may be the first RO or the second RO.

In the performing of the random access procedure, the instructions may cause the base station to: receive a Msg1 from the first terminal; transmit a Msg2 to the first terminal in response to the Msg1; receive a Msg3 from the first terminal; and identify the terminal type as the normal terminal or the RedCap terminal based on an indicator included in the Msg3.

In the performing of the random access procedure, the instructions may cause the base station to: receive a MsgA including a PRACH preamble and a physical uplink shared channel (PUSCH) from the first terminal; and identify the terminal type as the normal terminal or the RedCap terminal based on a transmission resource of the PUSCH.

In the performing of the random access procedure, the instructions may cause the base station to: receive a MsgA including a PRACH preamble and a PUSCH from the first terminal; and identify the terminal type as the normal terminal or the RedCap terminal based on an indicator included in the PUSCH.

In the performing of the random access procedure, the instructions may cause the base station to: receive a PRACH preamble from the first terminal that is the RedCap terminal; calculate a second radio network temporary identifier (RNTI) based on a transmission resource of the PRACH preamble; and transmit downlink control information (DCI) scrambled by the second RNTI to the RedCap terminal, wherein a value of the second RNTI is a result of a second equation obtained by applying an offset to a first equation for calculating a first RNTI of the normal terminal.

According to the exemplary embodiments of the present disclosure, first RACH configuration information for normal terminals and second RACH configuration information for RedCap terminals may be configured independently. A normal terminal may perform a random access procedure based on the first RACH configuration information, and a RedCap terminal may perform a random access procedure based on the second RACH configuration information. The base station may distinguish the normal terminal from the RedCap terminal based on the first RACH configuration information and/or the second RACH configuration information in the random access procedure. The base station may restrict the random access procedure of the RedCap terminal when necessary. Accordingly, the communication system can be efficiently operated.

BRIEF DESCRIPTION OF DRAWINGS

FIG. 7 is a conceptual diagram illustrating a second exemplary embodiment of a method of transmitting SS/PBCH blocks in a communication system.

DETAILED DESCRIPTION OF THE EMBODIMENTS

Figure 1:
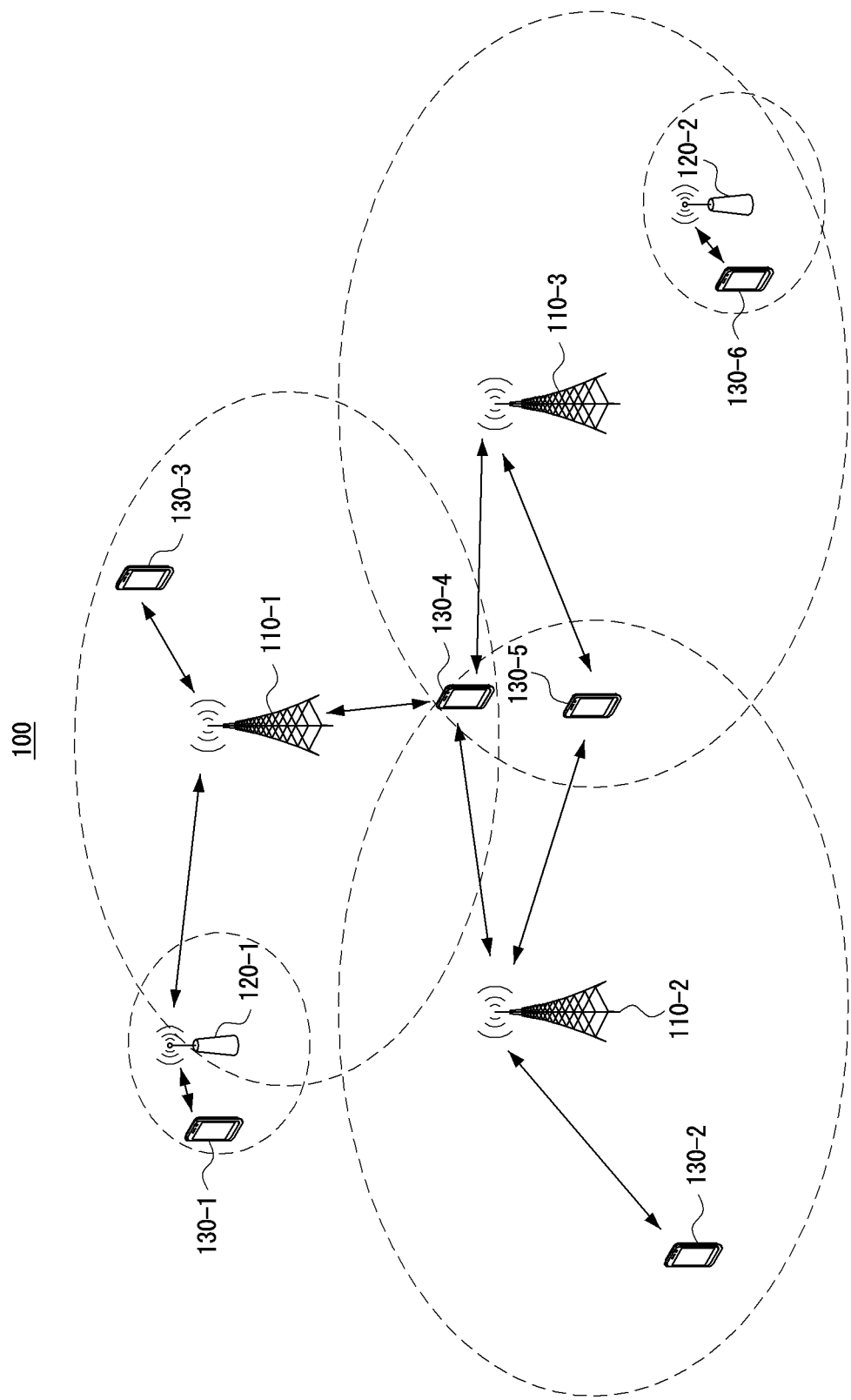
FIG. 1 is a conceptual diagram illustrating a first exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, 'at least one of A and B' may mean 'at least one of A or B' or 'at least one of combinations of one or more of A and B'. Also, in exemplary embodiments of the present disclosure, 'one or more of A and B' may mean 'one or more of A or B' or 'one or more of combinations of one or more of A and B'.

In exemplary embodiments of the present disclosure, '(re)transmission' may mean 'transmission', 'retransmission', or 'transmission and retransmission', '(re)configuration' may mean 'configuration', 'reconfiguration', or 'configuration and reconfiguration', '(re)connection' may mean 'connection', 'reconnection', or 'connection and reconnection', and '(re-)access' may mean 'access', 're-access', or 'access and re-access'.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may be used in the same sense as a communication network.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. In addition, the communication system 100 may further comprise a core network (e.g., a serving gateway (S-GW), a packet data network (PDN) gateway (P-GW), and a mobility management entity (MME)). When the communication system 100 is a 5G communication system (e.g., new radio (NR) system), the core network may include an access and mobility management function (AMF), a user plane function (UPF), a session management function (SMF), and the like.

The plurality of communication nodes 110 to 130 may support a communication protocol defined by the 3rd generation partnership project (3GPP) specifications (e.g., LTE communication protocol, LTE-A communication protocol, NR communication protocol, or the like). The plurality of communication nodes 110 to 130 may support code division multiple access (CDMA) technology, wideband CDMA (WCDMA) technology, time division multiple access (TDMA) technology, frequency division multiple access (FDMA) technology, orthogonal frequency division multiplexing (OFDM) technology, filtered OFDM technology, cyclic prefix OFDM (CP-OFDM) technology, discrete Fourier transform-spread-OFDM (DFT-s-OFDM) technology, orthogonal frequency division multiple access (OFDMA) technology, single carrier FDMA (SC-FDMA) technology, non-orthogonal multiple access (NOMA) technology, generalized frequency division multiplexing (GFDM) technology, filter band multi-carrier (FBMC) technology, universal filtered multi-carrier (UFMC) technology, space division multiple access (SDMA) technology, or the like. Each of the plurality of communication nodes may have the following structure.

Figure 2:
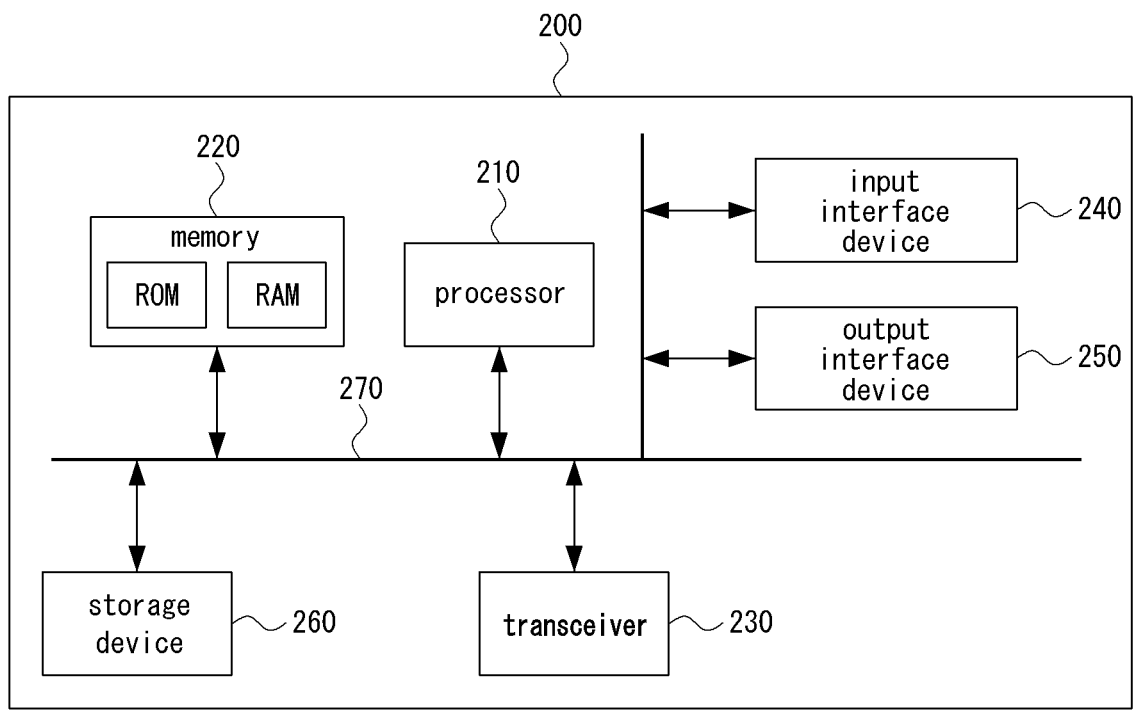
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may not be connected to the common bus 270 but may be connected to the processor 210 via an individual interface or a separate bus. For example, the processor 210 may be connected to at least one of the memory 220, the transceiver 230, the input interface device 240, the output interface device 250 and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B (NB), a evolved Node-B (eNB), a gNB, an advanced base station (ABS), a high reliability-base station (HR-BS), a base transceiver station (BTS), a radio base station, a radio transceiver, an access point, an access node, a radio access station (RAS), a mobile multihop relay-base station (MMR-BS), a relay station (RS), an advanced relay station (ARS), a high reliability-relay station (HR-RS), a home NodeB (HNB), a home eNodeB (HeNB), a road side unit (RSU), a radio remote head (RRH), a transmission point (TP), a transmission and reception point (TRP), or the like.

Each of the plurality of terminals 130-1, 130-2, 130-3, 130-4, 130-5, and 130-6 may refer to a user equipment (UE), a terminal equipment (TE), an advanced mobile station (AMS), a high reliability-mobile station (HR-MS), a terminal, an access terminal, a mobile terminal, a station, a subscriber station, a mobile station, a portable subscriber station, a node, a device, an on-board unit (OBU), or the like.

Each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support a multi-input multi-output (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, device-to-device (D2D) communication (or, proximity services (ProSe)), Internet of Things (IoT) communications, dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Meanwhile, the communication system may support three types of frame structures. A type 1 frame structure may be applied to a frequency division duplex (FDD) communication system, a type 2 frame structure may be applied to a time division duplex (TDD) communication system, and a type 3 frame structure may be applied to an unlicensed band based communication system (e.g., a licensed assisted access (LAA) communication system).

Figure 3:
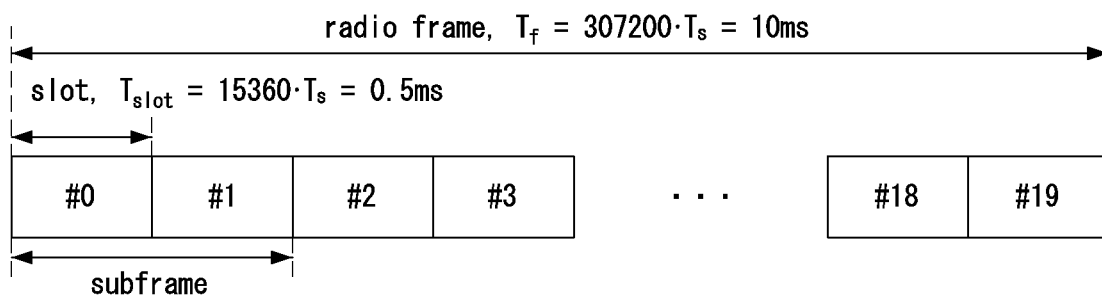
FIG. 3 is a conceptual diagram illustrating a first exemplary embodiment of a type 1 frame.

FIG. 3 is a conceptual diagram illustrating a first exemplary embodiment of a type 1 frame.

Referring to FIG. 3, a radio frame 300 may comprise 10 subframes, and a subframe may comprise 2 slots. Thus, the radio frame 300 may comprise 20 slots (e.g., slot #0, slot #1, slot #2, slot #3, ..., slot #18, and slot #19). The length $T_f$ of the radio frame 300 may be 10 milliseconds (ms). The length of the subframe may be 1 ms, and the length $T_{slot}$ of a slot may be 0.5 ms. Here, $T_s$ may indicate a sampling time, and may be 1/30,720,000 s.

The slot may be composed of a plurality of OFDM symbols in the time domain, and may be composed of a plurality of resource blocks (RBs) in the frequency domain. The RB may be composed of a plurality of subcarriers in the frequency domain. The number of OFDM symbols constituting the slot may vary depending on configuration of a cyclic prefix (CP). The CP may be classified into a normal CP and an extended CP. If the normal CP is used, the slot may be composed of 7 OFDM symbols, in which case the subframe may be composed of 14 OFDM symbols. If the extended CP is used, the slot may be composed of 6 OFDM symbols, in which case the subframe may be composed of 12 OFDM symbols.

Figure 4:
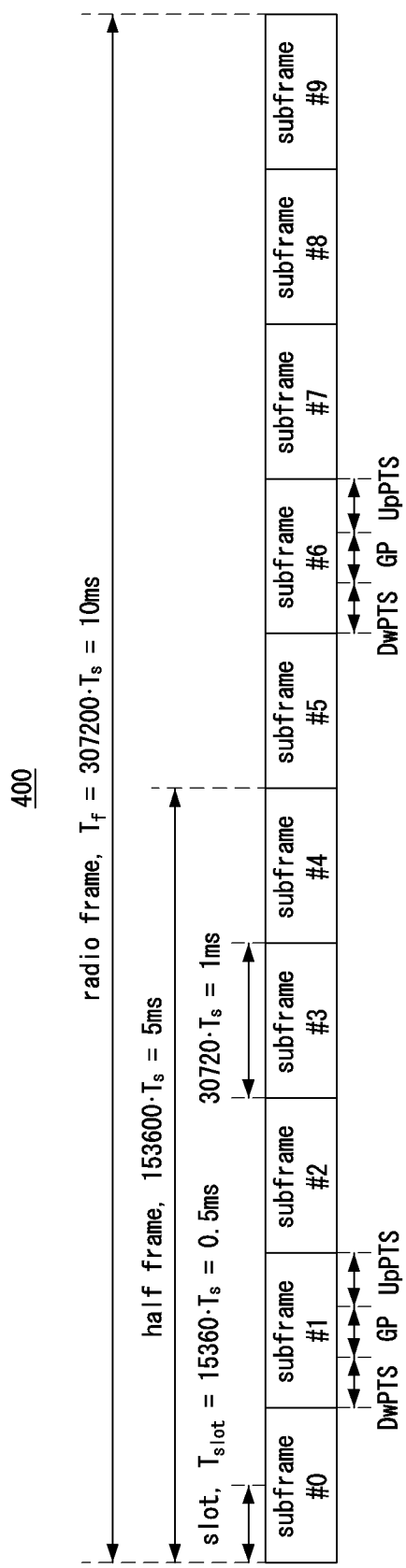
FIG. 4 is a conceptual diagram illustrating a first exemplary embodiment of a type 2 frame.

FIG. 4 is a conceptual diagram illustrating a first exemplary embodiment of a type 2 frame.

Referring to FIG. 4, a radio frame 400 may comprise two half frames, and a half frame may comprise 5 subframes.

Thus, the radio frame 400 may comprise 10 subframes. The length $T_f$ of the radio frame 400 may be 10 ms. The length of the half frame may be 5 ms. The length of the subframe may be 1 ms. Here, $T_s$ may be 1/30,720,000 s.

The radio frame 400 may include at least one downlink subframe, at least one uplink subframe, and a least one special subframe. Each of the downlink subframe and the uplink subframe may include two slots. The length Toot of a slot may be 0.5 ms. Among the subframes included in the radio frame 400, each of the subframe #1 and the subframe #6 may be a special subframe. For example, when a switching periodicity between downlink and uplink is 5 ms, the radio frame 400 may include 2 special subframes. Alternatively, the switching periodicity between downlink and uplink is 10 ms, the radio frame 400 may include one special subframe. The special subframe may include a downlink pilot time slot (DwPTS), a guard period (GP), and an uplink pilot time slot (UpPTS).

The downlink pilot time slot may be regarded as a downlink interval and may be used for cell search, time and frequency synchronization acquisition of the terminal, channel estimation, and the like. The guard period may be used for resolving interference problems of uplink data transmission caused by delay of downlink data reception. Also, the guard period may include a time required for switching from the downlink data reception operation to the uplink data transmission operation. The uplink pilot time slot may be used for uplink channel estimation, time and frequency synchronization acquisition, and the like. Transmission of a physical random access channel (PRACH) or a sounding reference signal (SRS) may be performed in the uplink pilot time slot.

The lengths of the downlink pilot time slot, the guard period, and the uplink pilot time slot included in the special subframe may be variably adjusted as needed. In addition, the number and position of each of the downlink subframe, the uplink subframe, and the special subframe included in the radio frame 400 may be changed as needed.

In the communication system, a transmission time interval (TTI) may be a basic time unit for transmitting coded data through a physical layer. A short TTI may be used to support low latency requirements in the communication system. The length of the short TTI may be less than 1 ms. The conventional TTI having a length of 1 ms may be referred to as a base TTI or a regular TTI. That is, the base TTI may be composed of one subframe. In order to support transmission on a base TTI basis, signals and channels may be configured on a subframe basis. For example, a cell-specific reference signal (CRS), a physical downlink control channel (PDCCH), a physical downlink shared channel (PDSCH), a physical uplink control channel (PUCCH), a physical uplink shared channel (PUSCH), and the like may exist in each subframe.

On the other hand, a synchronization signal (e.g., a primary synchronization signal (PSS) and a secondary synchronization signal (SSS)) may exist for every 5 subframes, and a physical broadcast channel (PBCH) may exist for every 10 subframes. Also, each radio frame may be identified by an SFN, and the SFN may be used for defining transmission of a signal (e.g., a paging signal, a reference signal for channel estimation, a signal for channel state information, etc.) longer than one radio frame. The periodicity of the SFN may be 1024.

In the LTE system, the PBCH may be a physical layer channel used for transmission of system information (e.g., master information block (MIB)). The PBCH may be transmitted every 10 subframes. That is, the transmission periodicity of the PBCH may be 10 ms, and the PBCH may be transmitted once in the radio frame. The same MIB may be transmitted during 4 consecutive radio frames, and after 4 consecutive radio frames, the MIB may be changed according to a situation of the LTE system. The transmission period for which the same MIB is transmitted may be referred to as a 'PBCH TTI', and the PBCH TTI may be 40 ms. That is, the MIB may be changed for each PBCH TTI.

The MIB may be composed of 40 bits. Among the 40 bits constituting the MIB, 3 bits may be used to indicate a system band, 3 bits may be used to indicate physical hybrid automatic repeat request (ARQ) indicator channel (PHICH) related information, 8 bits may be used to indicate an SFN, 10 bits may be configured as reserved bits, and 16 bits may be used for a cyclic redundancy check (CRC).

The SFN for identifying the radio frame may be composed of a total of 10 bits (B9 to B0), and the most significant bits (MSBs) 8 bits (B9 to B2) among the 10 bits may be indicated by the PBCH (i.e., MIB). The MSBs 8 bits (B9 to B2) of the SFN indicated by the PBCH (i.e., MIB) may be identical during 4 consecutive radio frames (i.e., PBCH TTI). The least significant bits (LSBs) 2 bits (B1 to B0) of the SFN may be changed during 4 consecutive radio frames (i.e., PBCH TTI), and may not be explicitly indicated by the PBCH (i.e., MIB). The LSBs (2 bits (B1 to B0)) of the SFN may be implicitly indicated by a scrambling sequence of the PBCH (hereinafter referred to as 'PBCH scrambling sequence').

A gold sequence generated by being initialized by a cell ID may be used as the PBCH scrambling sequence, and the PBCH scrambling sequence may be initialized for each four consecutive radio frames (e.g., each PBCH TTI) based on an operation of 'mod (SFN, 4)'. The PBCH transmitted in a radio frame corresponding to an SFN with LSBs 2 bits (B1 to B0) set to '00' may be scrambled by the gold sequence generated by being initialized by the cell ID. Thereafter, the gold sequences generated according to the operation of 'mod (SFN, 4)' may be used to scramble the PBCH transmitted in the radio frames corresponding to SFNs with LSBs 2 bits (B1 to B0) set to '01', '10', and '11'.

Accordingly, the terminal having acquired the cell ID in the initial cell search process may identify the value of the LSBs 2 bits (B1 to B0) of the SFN (e.g., '00', '01', '10', or '11') based on the PBCH scramble sequence obtained in the decoding process for the PBCH (i.e., MIB). The terminal may use the LSBs 2 bits (B1 to B0) of the SFN obtained based on the PBCH scrambling sequence and the MSBs 8 bits (B9 to B2) of the SFN indicated by the PBCH (i.e., MIB) so as to identify the SFN (i.e., the entire bits B9 to B0 of the SFN).

On the other hand, the communication system may support not only a high transmission rate but also technical requirements for various service scenarios. For example, the communication system may support an enhanced mobile broadband (eMBB) service, an ultra-reliable low-latency communication (URLLC) service, a massive machine type communication (mMTC) service, and the like.

The subcarrier spacing of the communication system (e.g., OFDM-based communication system) may be determined based on a carrier frequency offset (CFO) and the like. The CFO may be generated by a Doppler effect, a phase drift, or the like, and may increase in proportion to an operation frequency. Therefore, in order to prevent the performance degradation of the communication system due to the CFO, the subcarrier spacing may increase in proportion to the operation frequency. On the other hand, as the subcarrier spacing increases, a CP overhead may increase.

Therefore, the subcarrier spacing may be configured based on a channel characteristic, a radio frequency (RF) characteristic, etc. according to a frequency band.

The communication system may support numerologies defined in Table 1 below.

TABLE 1

| | Numerology ($\mu$) | | | | | |
|---|---|---|---|---|---|---|
| | 0 | 1 | 2 | 3 | 4 | 5 |
| Subcarrier spacing | 15 kHz | 30 kHz | 60 kHz | 120 kHz | 240 kHz | 480 kHz |
| OFDM symbol length [us] | 66.7 | 33.3 | 16.7 | 8.3 | 4.2 | 2.1 |
| CP length [us] | 4.76 | 2.38 | 1.19 | 0.60 | 0.30 | 0.15 |
| Number of OFDM symbols within 1 ms | 14 | 28 | 56 | 112 | 224 | 448 |

For example, the subcarrier spacing of the communication system may be configured to 15 kHz, 30 kHz, 60 kHz, or 120 kHz. The subcarrier spacing of the LTE system may be 15 kHz, and the subcarrier spacing of the NR system may be 1, 2, 4, or 8 times the conventional subcarrier spacing of 15 kHz. If the subcarrier spacing increases by exponentiation units of 2 of the conventional subcarrier spacing, the frame structure can be easily designed.

The communication system may support a wide frequency band (e.g., several hundred MHz to tens of GHz). Since the diffraction characteristic and the reflection characteristic of the radio wave are poor in a high frequency band, a propagation loss (e.g., path loss, reflection loss, and the like) in a high frequency band may be larger than a propagation loss in a low frequency band. Therefore, a cell coverage of a communication system supporting a high frequency band may be smaller than a cell coverage of a communication system supporting a low frequency band. In order to solve such the problem, a beamforming scheme based on a plurality of antenna elements may be used to increase the cell coverage in the communication system supporting a high frequency band.

The beamforming scheme may include a digital beamforming scheme, an analog beamforming scheme, a hybrid beamforming scheme, and the like. In the communication system using the digital beamforming scheme, a beamforming gain may be obtained using a plurality of RF paths based on a digital precoder or a codebook. In the communication system using the analog beamforming scheme, a beamforming gain may be obtained using analog RF devices (e.g., phase shifter, power amplifier (PA), variable gain amplifier (VGA), and the like) and an antenna array.

Because of the need for expensive digital to analog converters (DACs) or analog to digital converters (ADCs) for digital beamforming schemes and transceiver units corresponding to the number of antenna elements, the complexity of antenna implementation may be increased to increase the beamforming gain. In case of the communication system using the analog beamforming scheme, since a plurality of antenna elements are connected to one transceiver unit through phase shifters, the complexity of the antenna implementation may not increase greatly even if the beamforming gain is increased. However, the beamforming performance of the communication system using the analog beamforming scheme may be lower than the beamforming performance of the communication system using the digital beamforming scheme. Further, in the communication system using the analog beamforming scheme, since the phase shifter is adjusted in the time domain, frequency resources may not be efficiently used. Therefore, a hybrid beam forming scheme, which is a combination of the digital scheme and the analog scheme, may be used.

When the cell coverage is increased by the use of the beamforming scheme, common control channels and common signals (e.g., reference signal and synchronization signal) for all terminals belonging to the cell coverage as well as control channels and data channels for each terminal may also be transmitted based on the beamforming scheme. In this case, the common control channels and the common signals for all terminals belonging to the cell coverage may be transmitted based on a beam sweeping scheme.

In addition, in the NR system, a synchronization signal/physical broadcast channel (SS/PBCH) block may also be transmitted in a beam sweeping scheme. The SS/PBCH block may be composed of a PSS, an SSS, a PBCH, and the like. In the SS/PBCH block, the PSS, the SSS, and the PBCH may be configured in a time division multiplexing (TDM) manner. The SS/PBCH block may be referred also to as an 'SS block (SSB)'. One SS/PBCH block may be transmitted using N consecutive OFDM symbols. Here, N may be an integer equal to or greater than 4. The base station may periodically transmit the SS/PBCH block, and the terminal may acquire frequency/time synchronization, a cell ID, system information, and the like based on the SS/PBCH block received from the base station. The SS/PBCH block may be transmitted as follows.

Figure 5:
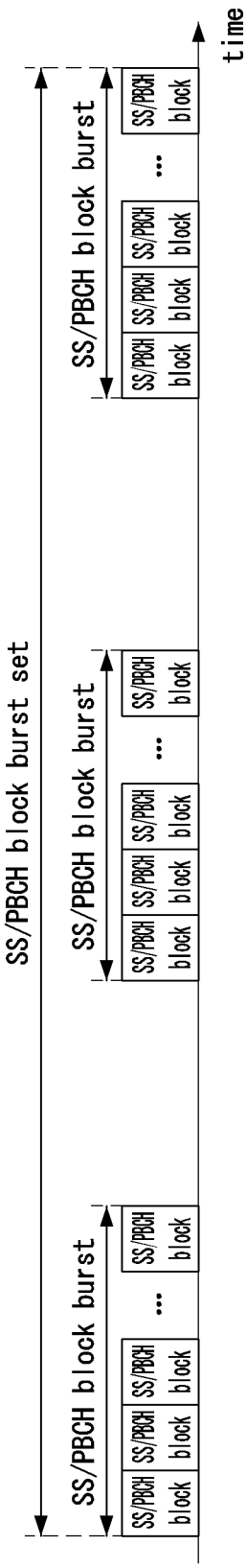
FIG. 5 is a conceptual diagram illustrating a first exemplary embodiment of a transmission method of SS/PBCH block in a communication system.

FIG. 5 is a conceptual diagram illustrating a first exemplary embodiment of a transmission method of SS/PBCH block in a communication system.

Referring to FIG. 5, one or more SS/PBCH blocks may be transmitted in a beam sweeping scheme within an SS/PBCH block burst set. Up to L SS/PBCH blocks may be transmitted within one SS/PBCH block burst set. L may be an integer equal to or greater than 2, and may be defined in the 3GPP standard. Depending on a region of a system frequency, L may vary. Within the SS/PBCH block burst set, the SS/PBCH blocks may be located consecutively or distributedly. The consecutive SS/PBCH blocks may be referred to as an 'SS/PBCH block burst'. The SS/PBCH block burst set may be repeated periodically, and system information (e.g., MIB) transmitted through the PBCHs of the SS/PBCH blocks within the SS/PBCH block burst set may be the same. An index of the SS/PBCH block, an index of the SS/PBCH block burst, an index of an OFDM symbol, an index of a slot, and the like may be indicated explicitly or implicitly by the PBCH.

Figure 6:
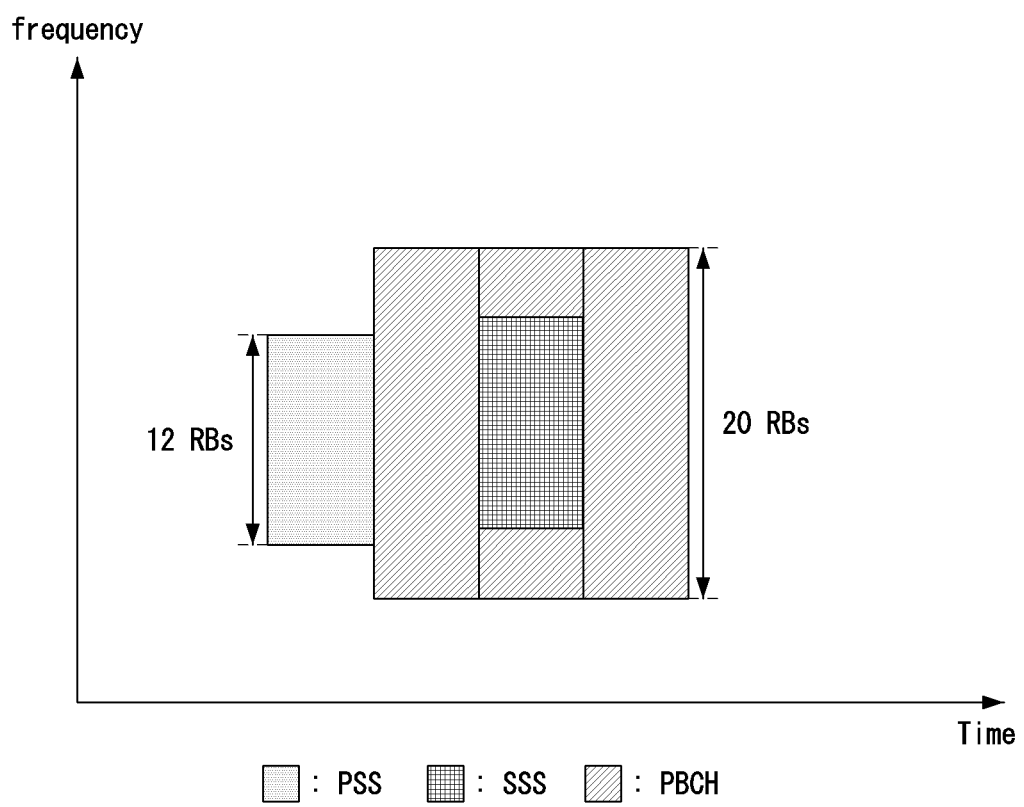
FIG. 6 is a conceptual diagram illustrating a first exemplary embodiment of an SS/PBCH block in a communication system.

FIG. 6 is a conceptual diagram illustrating a first exemplary embodiment of an SS/PBCH block in a communication system.

Referring to FIG. 6, signals and a channel are arranged within one SS/PBCH block in the order of 'PSS→PBCH→SSS→PBCH'. The PSS, SSS, and PBCH within the SS/PBCH block may be configured in a TDM scheme. In a symbol where the SSS is located, the PBCH may be located in frequency resources above the SSS and frequency resources below the SSS. That is, the PBCH may be transmitted in both end bands adjacent to the frequency band in which the SSS is transmitted. When the maximum number of SS/PBCH blocks is 8 in the sub 6 GHz frequency band, an SS/PBCH block index may be identified based on a demodulation reference signal used for demodulating the PBCH (hereinafter, referred to as 'PBCH DMRS'). When the maximum number of SSBs is 64 in the over 6 GHz frequency band, LSB 3 bits of 6 bits representing the SS/PBCH block index may be identified based on the PBCH DMRS, and the remaining MSB 3 bits may be identified based on a payload of the PBCH.

The maximum system bandwidth that can be supported in the NR system may be 400 MHz. The size of the maximum bandwidth that can be supported by the terminal may vary depending on the capability of the terminal. Therefore, the terminal may perform an initial access procedure (e.g., initial connection procedure) by using some of the system bandwidth of the NR system supporting a wide band. In order to support access procedures of terminals supporting various sizes of bandwidths, SS/PBCH blocks may be multiplexed in the frequency domain within the system bandwidth of the NR system supporting a wide band. In this case, the SS/PBCH blocks may be transmitted as follows.

FIG. 7 is a conceptual diagram illustrating a second exemplary embodiment of a method of transmitting SS/PBCH blocks in a communication system.

Referring to FIG. 7, a wideband component carrier (CC) may include a plurality of bandwidth parts (BWPs). For example, the wideband CC may include 4 BWPs. The base station may transmit SS/PBCH blocks in the respective BWPs #0 to #3 belonging to the wideband CC. The terminal may receive the SS/PBCH block(s) from one or more BWPs of the BWPs #0 to #3, and may perform an initial access procedure using the received SS/PBCH block.

After detecting the SS/PBCH block, the terminal may acquire system information (e.g., remaining minimum system information (RMSI)), and may perform a cell access procedure based on the system information. The RMSI may be transmitted on a PDSCH scheduled by a PDCCH. Configuration information of a control resource set (CORESET) in which the PDCCH including scheduling information of the PDSCH through which the RMSI is transmitted may be transmitted on a PBCH within the SS/PBCH block. A plurality of SS/PBCH blocks may be transmitted in the entire system band, and one or more SS/PBCH blocks among the plurality of SS/PBCH blocks may be SS/PBCH block(s) associated with the RMSI. The remaining SS/PBCH blocks may not be associated with the RMSI. The SS/PBCH block associated with the RMSI may be defined as a 'cell defining SS/PBCH block'. The terminal may perform a cell search procedure and an initial access procedure by using the cell-defining SS/PBCH block. The SS/PBCH block not associated with the RMSI may be used for a synchronization procedure and/or a measurement procedure in the corresponding BWP. The BWP(s) through which the SS/PBCH block is transmitted may be limited to one or more BWPs within a wide bandwidth.

The RMSI may be obtained by performing an operation to obtain configuration information of a CORESET from the SS/PBCH block (e.g., PBCH), an operation of detecting a PDCCH based on the configuration information of the CORESET, an operation to obtain scheduling information of a PDSCH from the PDCCH, and an operation to receive the RMSI through the PDSCH. A transmission resource of the PDCCH may be configured by the configuration information of the CORESET. A mapping patter of the RMSI CORESET pattern may be defined as follows. The RMSI CORESET may be a CORESET used for transmission and reception of the RMSI.

Figure 8A:
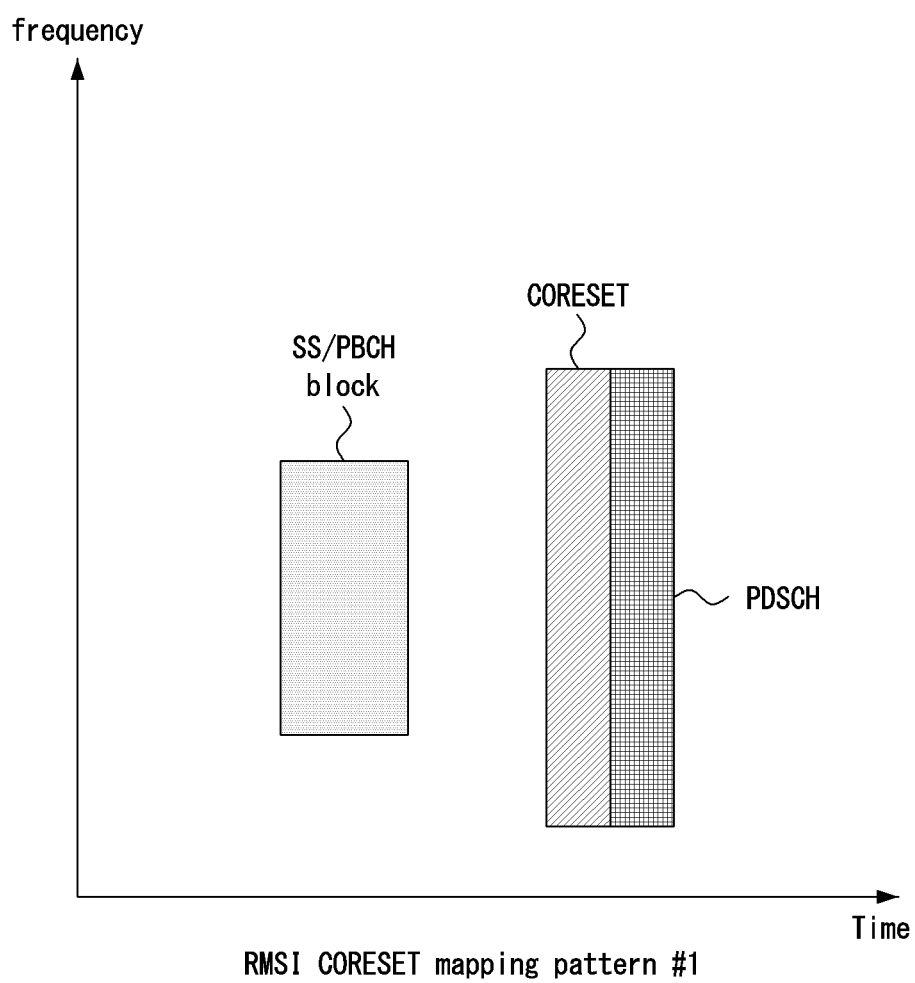
FIG. 8A is a conceptual diagram illustrating an RMSI CORESET mapping pattern #1 in a communication system.
Figure 8B:
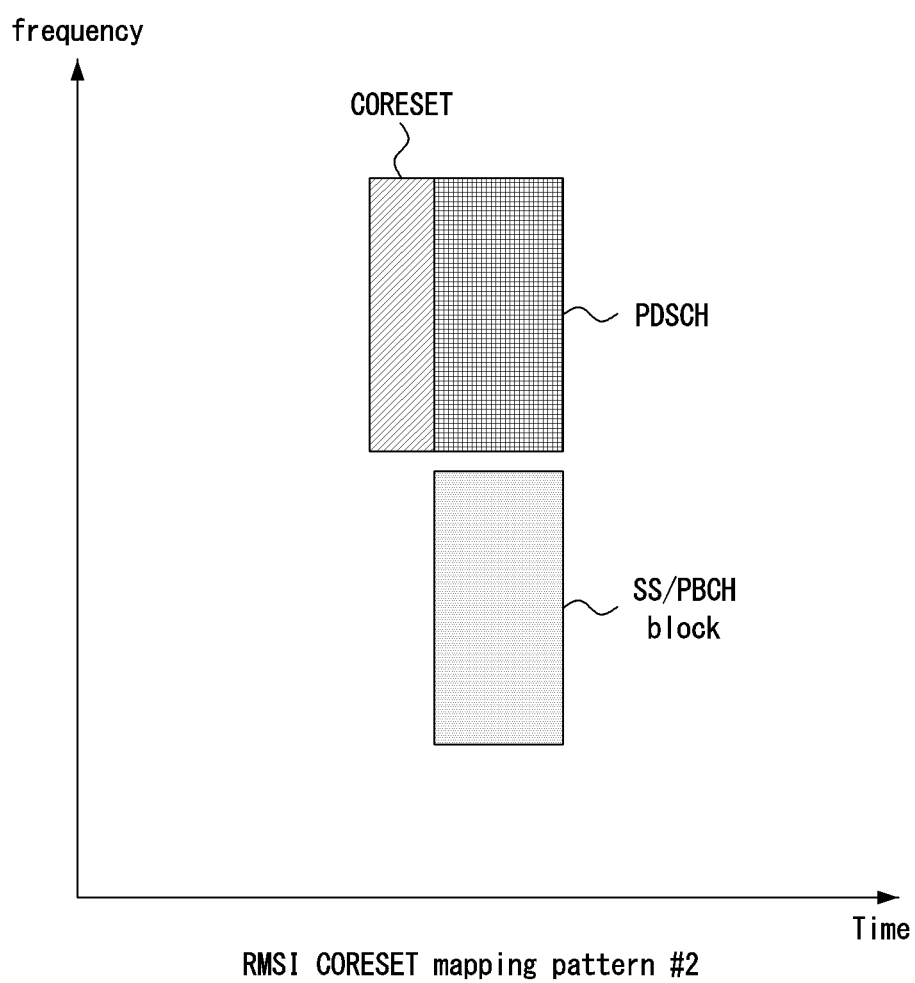
FIG. 8B is a conceptual diagram illustrating an RMSI CORESET mapping pattern #2 in a communication system.
Figure 8C:
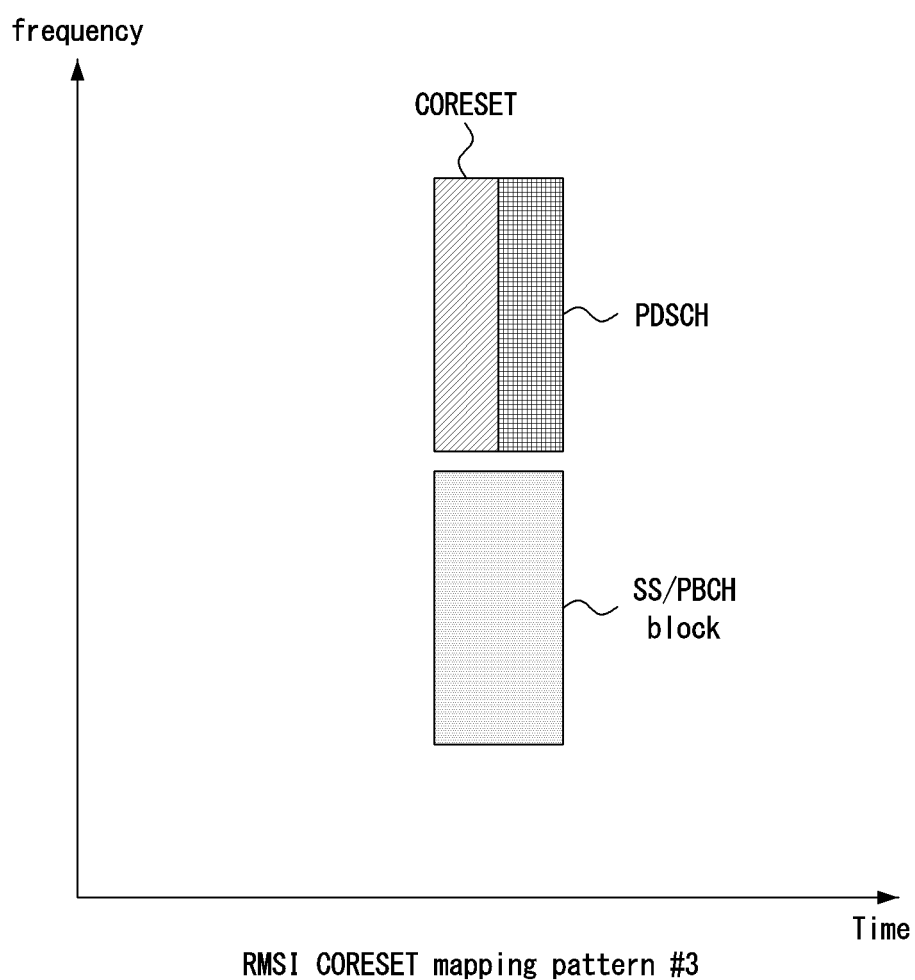
FIG. 8C is a conceptual diagram illustrating an RMSI CORESET mapping pattern #3 in a communication system.

FIG. 8A is a conceptual diagram illustrating an RMSI CORESET mapping pattern #1 in a communication system, FIG. 8B is a conceptual diagram illustrating an RMSI CORESET mapping pattern #2 in a communication system, and FIG. 8C is a conceptual diagram illustrating an RMSI CORESET mapping pattern #3 in a communication system.

Referring to FIGS. 8A to 8C, one RMSI CORESET mapping pattern among the RMSI CORESET mapping patterns #1 to #3 may be used, and a detailed configuration according to the one RMSI CORESET mapping pattern may be determined. In the RMSI CORESET mapping pattern #1, the SS/PBCH block, the CORESET (i.e., RMSI CORESET), and the PDSCH (i.e., RMSI PDSCH) may be configured in a TDM scheme. The RMSI PDSCH may mean the PDSCH through which the RMSI is transmitted. In the RMSI CORESET mapping pattern #2, the CORESET (i.e., RMSI CORESET) and the PDSCH (i.e., RMSI PDSCH) may be configured in a TDM scheme, and the PDSCH (i.e., RMSI PDSCH) and the SS/PBCH block may be configured in a frequency division multiplexing (FDM) scheme. In the RMSI CORESET mapping pattern #3, the CORESET (i.e., RMSI CORESET) and the PDSCH (i.e., RMSI PDSCH) may be configured in a TDM scheme, and the CORESET (i.e., RMSI CORESET) and the PDSCH (i.e., RMSI PDSCH) may be multiplexed with the SS/PBCH block in a FDM scheme.

In the frequency band of 6 GHz or below, only the RMSI CORESET mapping pattern #1 may be used. In the frequency band of 6 GHz or above, all of the RMSI CORESET mapping patterns #1, #2, and #3 may be used. The numerology of the SS/PBCH block may be different from that of the RMSI CORESET and the RMSI PDSCH. Here, the numerology may be a subcarrier spacing. In the RMSI CORESET mapping pattern #1, a combination of all numerologies may be used. In the RMSI CORESET mapping pattern #2, a combination of numerologies (120 kHz, 60 kHz) or (240 kHz, 120 kHz) may be used for the SS/PBCH block and the RMSI CORESET/PDSCH. In the RMSI CORESET mapping pattern #3, a combination of numerologies (120 kHz, 120 kHz) may be used for the SS/PBCH block and the RMSI CORESET/PDSCH.

One RMSI CORESET mapping pattern may be selected from the RMSI CORESET mapping patterns #1 to #3 according to the combination of the numerology of the SS/PBCH block and the numerology of the RMSI CORESET/PDSCH. The configuration information of the RMSI CORESET may include Table A and Table B. Table A may represent the number of resource blocks (RBs) of the RMSI CORESET, the number of symbols of the RMSI CORESET, and an offset between an RB (e.g., starting RB or ending RB) of the SS/PBCH block and an RB (e.g., starting RB or ending RB) of the RMSI CORESET. Table B may represent the number of search space sets per slot, an offset of the RMSI CORESET, and an OFDM symbol index in each of the RMSI CORESET mapping patterns. Table B may represent information for configuring a monitoring occasion of the RMSI PDCCH. Each of Table A and Table B may be composed of a plurality of sub-tables. For example, Table A may include sub-tables 13-1 to 13-8 defined in the technical specification (TS) 38.213, and Table B may include sub-tables 13-9 to 13-13 defined in the TS 38.213. The size of each of Table A and Table B may be 4 bits.

In the NR system, a PDSCH may be mapped to the time domain according to a PDSCH mapping type A or a PDSCH mapping type B. The PDSCH mapping types A and B may be defined as Table 2 below.

TABLE 2

| PDSCH mapping type | Normal CP | | | Extended CP | | |
|---|---|---|---|---|---|---|
| | S | L | S + L | S | L | S + L |
| Type A | {0, 1, 2, 3} (Note 1) | {3, . . . , 14} | {3, . . . , 14} | {0, 1, 2, 3} (Note 1) | {3, . . . , 12} | {3, . . . , 12} |
| Type B | {0, . . . , 12} | {2, 4, 7} | {2, . . . , 14} | {0, . . . , 10} | {2, 4, 6} | {2, . . . , 12} |

Note 1:
S = 3 is applicable only if dmrs-TypeA-Position = 3

The type A (i.e., PDSCH mapping type A) may be slot-based transmission. When the type A is used, a position of a start symbol of a PDSCH may be configured to one of {0, 1, 2, 3}. When the type A and a normal CP are used, the number of symbols constituting the PDSCH (e.g., the duration of the PDSCH) may be configured to one of 3 to 14 within a range not exceeding a slot boundary. The type B (i.e., PDSCH mapping type B) may be non-slot-based transmission. When the type B is used, a position of a start symbol of a PDSCH may be configured to one of 0 to 12. When the type B and the normal CP are used, the number of symbols constituting the PDSCH (e.g., the duration of the PDSCH) may be configured to one of {2, 4, 7} within a range not exceeding a slot boundary. A DMRS (hereinafter, referred to as 'PDSCH DMRS') for demodulation of the PDSCH (e.g., data) may be determined by a value of ID indicating the PDSCH mapping type (e.g., type A or type B) and the length. The ID may be defined differently according to the PDSCH mapping type.

Meanwhile, NR-unlicensed (NR-U) is being discussed in the NR standardization meeting. The NR-U system may increase network capacity by improving the utilization of limited frequency resources. The NR-U system may support operation in an unlicensed band (e.g., unlicensed spectrum).

In the NR-U system, the terminal may determine whether a signal is transmitted from a base station based on a discovery reference signal (DRS) received from the corresponding base station in the same manner as in the general NR system. In the NR-U system in a Stand-Alone (SA) mode, the terminal may acquire synchronization and/or system information based on the DRS. In the NR-U system, the DRS may be transmitted according to a regulation of the unlicensed band (e.g., transmission band, transmission power, transmission time, etc.). For example, according to Occupied Channel Bandwidth (OCB) regulations, signals may be configured and/or transmitted to occupy 80% of the total channel bandwidth (e.g., 20 MHz).

In the NR-U system, a communication node (e.g., base station, terminal) may perform a Listen Before Talk (LBT) procedure before transmitting a signal and/or a channel for coexistence with another system. The signal may be a synchronization signal, a reference signal (e.g., DRS, DMRS, channel state information (CSI)-RS, phase tracking (PT)-RS, sounding reference signal (SRS)), or the like. The channel may be a downlink channel, an uplink channel, a sidelink channel, or the like. In exemplary embodiments, a signal may mean the 'signal', the 'channel', or the 'signal and channel'. The LBT procedure may be an operation for checking whether a signal is transmitted by another communication node. If it is determined by the LBT procedure that there is no transmission signal (e.g., when the LBT procedure is successful), the communication node may transmit a signal in the unlicensed band. If it is determined by the LBT procedure that a transmission signal exists (e.g., when the LBT fails), the communication node may not be able to transmit a signal in the unlicensed band. The communication node may perform a LBT procedure according to one of various categories before transmission of a signal. The category of LBT may vary depending on the type of the transmission signal.

Meanwhile, NR vehicle-to-everything (V2X) communication technology is being discussed in the NR standardization meeting. The NR V2X communication technology may be a technology that supports communication between vehicles, communication between a vehicle and an infrastructure, communication between a vehicle and a pedestrian, and the like based on device-to-device (D2D) communication technologies.

The NR V2X communication (e.g., sidelink communication) may be performed according to three transmission schemes (e.g., unicast scheme, broadcast scheme, groupcast scheme). When the unicast scheme is used, a PC5-RRC connection may be established between a first terminal (e.g. transmitting terminal that transmits data) and a second terminal (e.g., receiving terminal that receives data), and the PC5-RRC connection may refer to a logical connection for a pair between a source ID of the first terminal and a destination ID of the second terminal. The first terminal may transmit data (e.g., sidelink data) to the second terminal. When the broadcast scheme is used, the first terminal may transmit data to all terminals. When the groupcast scheme is used, the first terminal may transmit data to a group (e.g., groupcast group) composed of a plurality of terminals.

When the unicast scheme is used, the second terminal may transmit feedback information (e.g., acknowledgment (ACK) or negative ACK (NACK)) to the first terminal in response to data received from the first terminal. In the exemplary embodiments below, the feedback information may be referred to as a 'HARQ-ACK', 'feedback signal', a 'physical sidelink feedback channel (PSFCH) signal', or the like. When ACK is received from the second terminal, the first terminal may determine that the data has been successfully received at the second terminal. When NACK is received from the second terminal, the first terminal may determine that the second terminal has failed to receive the data. In this case, the first terminal may transmit additional information to the second terminal based on an HARQ scheme. Alternatively, the first terminal may improve a reception probability of the data at the second terminal by retransmitting the same data to the second terminal.

When the broadcast scheme is used, a procedure for transmitting feedback information for data may not be performed. For example, system information may be transmitted in the broadcast scheme, and the terminal may not transmit feedback information for the system information to the base station. Therefore, the base station may not identify whether the system information has been successfully received at the terminal. To solve this problem, the base station may periodically broadcast the system information.

When the groupcast scheme is used, a procedure for transmitting feedback information for data may not be performed. For example, necessary information may be periodically transmitted in the groupcast scheme, without the procedure for transmitting feedback information. However, when the candidates of terminals participating in the groupcast scheme-based communication and/or the number of the terminals participating in that is limited, and the data transmitted in the groupcast scheme is data that should be received within a preconfigured time (e.g., data sensitive to delay), it may be necessary to transmit feedback information also in the groupcast sidelink communication. The groupcast sidelink communication may mean sidelink communication performed in the groupcast scheme. When the feedback information transmission procedure is performed in the groupcast sidelink communication, data can be transmitted and received efficiently and reliably.

In the groupcast sidelink communication, two HARQ-ACK feedback schemes (i.e., transmission procedures of feedback information) may be supported. When the number of receiving terminals in a sidelink group is large and a service scenario 1 is supported, some receiving terminals belonging to a specific range within the sidelink group may transmit NACK through a PSFCH when data reception fails. This scheme may be a groupcast HARQ-ACK feedback option 1. In the service scenario 1, instead of all the receiving terminals in the sidelink group, it may be allowed for some receiving terminals belonging to a specific range to perform reception in a best-effort manner. The service scenario 1 may be an extended sensor scenario in which some receiving terminals belonging to a specific range need to receive the same sensor information from a transmitting terminal. In exemplary embodiments, the transmitting terminal may refer to a terminal transmitting data, and the receiving terminal may refer to a terminal receiving data.

When the number of receiving terminals in the sidelink group is limited and a service scenario 2 is supported, each of all the receiving terminals belonging to the sidelink group may report HARQ-ACK for data individually through a separate PSFCH. This scheme may be a groupcast HARQ-ACK feedback option 2. In the service scenario 2, since PSFCH resources are sufficient, the transmitting terminal may perform monitoring on HARQ-ACK feedbacks of all the receiving terminals belonging to the sidelink group, and data reception may be guaranteed at all the receiving terminals belonging to the sidelink group.

In addition, data reliability at the receiving terminal may be improved by appropriately adjusting a transmit power of the transmitting terminal according to a transmission environment. Interference to other terminals may be mitigated by appropriately adjusting the transmit power of the transmitting terminal. Energy efficiency can be improved by reducing unnecessary transmit power. A power control scheme may be classified into an open-loop power control scheme and a closed-loop power control scheme. In the open-loop power control scheme, the transmitting terminal may determine the transmit power in consideration of configuration, a measured environment, etc. In the closed-loop power control scheme, the transmitting terminal may determine the transmit power based on a transmit power control (TPC) command received from the receiving terminal.

It may be difficult due to various causes including a multipath fading channel, interference, and the like to predict a received signal strength at the receiving terminal. Accordingly, the receiving terminal may adjust a receive power level (e.g., receive power range) by performing an automatic gain control (AGC) operation to prevent a quantization error of the received signal and maintain a proper receive power. In the communication system, the terminal may perform the AGC operation using a reference signal received from the base station. However, in the sidelink communication (e.g., V2X communication), the reference signal may not be transmitted from the base station. That is, in the sidelink communication, communication between terminals may be performed without the base station. Therefore, it may be difficult to perform the AGC operation in the sidelink communication. In the sidelink communication, the transmitting terminal may first transmit a signal (e.g., reference signal) to the receiving terminal before transmitting data, and the receiving terminal may adjust a receive power range (e.g., receive power level) by performing an AGC operation based on the signal received from the transmitting terminal. Thereafter, the transmitting terminal may transmit sidelink data to the receiving terminal. The signal used for the AGC operation may be a signal duplicated from a signal to be transmitted later or a signal preconfigured between the terminals.

A time period required for the ACG operation may be 15 μs. When a subcarrier spacing of 15 kHz is used in the NR system, a time period (e.g., length) of one symbol (e.g., OFDM symbol) may be 66.7 μs. When a subcarrier spacing of 30 kHz is used in the NR system, a time period of one symbol (e.g., OFDM symbol) may be 33.3 μs. In the following exemplary embodiments, a symbol may mean an OFDM symbol. That is, a time period of one symbol may be twice or more than a time period required for the ACG operation.

For sidelink communication, it may be necessary to transmit a data channel for data transmission and a control channel including scheduling information for data resource allocation. In sidelink communication, the data channel may be a physical sidelink shared channel (PSSCH), and the control channel may be a physical sidelink control channel (PSCCH). The data channel and the control channel may be multiplexed in a resource domain (e.g., time and frequency resource domains).

Figure 9:
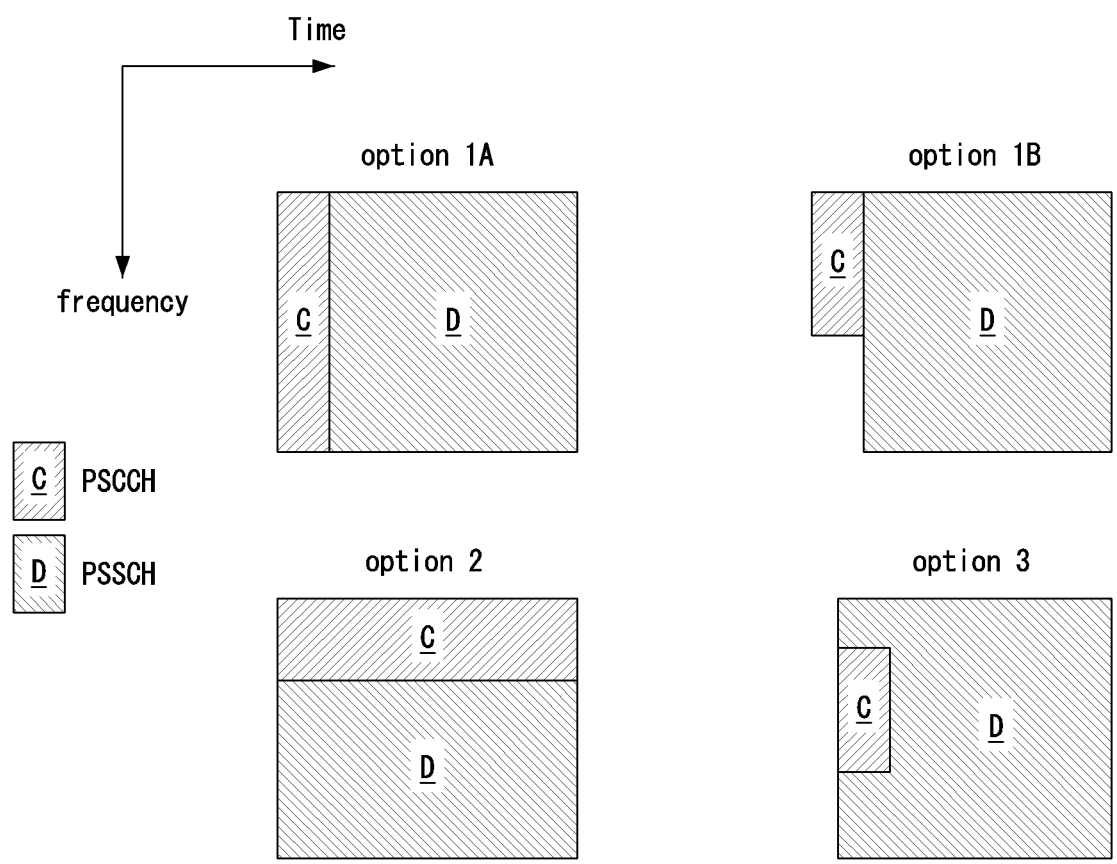
FIG. 9 is a conceptual diagram illustrating exemplary embodiments of a method for multiplexing a control channel and a data channel in sidelink communication.

FIG. 9 is a conceptual diagram illustrating exemplary embodiments of a method for multiplexing a control channel and a data channel in sidelink communication.

Referring to FIG. 9, sidelink communication may support an option 1A, an option 1B, an option 2, and an option 3. When the option 1A and/or the option 1B is supported, a control channel and a data channel may be multiplexed in the time domain. When the option 2 is supported, a control channel and a data channel may be multiplexed in the frequency domain. When the option 3 is supported, a control channel and a data channel may be multiplexed in the time and frequency domains. The sidelink communication may basically support the option 3.

In the sidelink communication (e.g., NR-V2X sidelink communication), a basic unit of resource configuration may be a subchannel. The subchannel may be defined with time and frequency resources. For example, the subchannel may be composed of a plurality of symbols (e.g., OFDM symbols) in the time domain, and may be composed of a plurality of resource blocks (RBs) in the frequency domain. The subchannel may be referred to as an RB set. In the subchannel, a data channel and a control channel may be multiplexed based on the option 3.

In the sidelink communication (e.g., NR-V2X sidelink communication), transmission resources may be allocated based on a mode 1 or a mode 2. When the mode 1 is used, a base station may allocate sidelink resource(s) for data transmission within a resource pool to a transmitting terminal, and the transmitting terminal may transmit data to a receiving terminal using the sidelink resource(s) allocated by the base station. Here, the transmitting terminal may be a terminal that transmits data in sidelink communication, and the receiving terminal may be a terminal that receives the data in sidelink communication.

When the mode 2 is used, a transmitting terminal may autonomously select sidelink resource(s) to be used for data transmission by performing a resource sensing operation and/or a resource selection operation within a resource pool. The base station may configure the resource pool for the mode 1 and the resource pool for the mode 2 to the terminal(s). The resource pool for the mode 1 may be configured independently from the resource pool for the mode 2. Alternatively, a common resource pool may be configured for the mode 1 and the mode 2.

When the mode 1 is used, the base station may schedule a resource used for sidelink data transmission to the transmitting terminal, and the transmitting terminal may transmit sidelink data to the receiving terminal by using the resource scheduled by the base station. Therefore, a resource conflict between terminals may be prevented. When the mode 2 is used, the transmitting terminal may select an arbitrary resource by performing a resource sensing operation and/or resource selection operation, and may transmit sidelink data by using the selected arbitrary resource. Since the above-described procedure is performed based on an individual resource sensing operation and/or resource selection operation of each transmitting terminal, a conflict between selected resources may occur.

The sidelink communication system supporting Release-16 may be designed for terminals (e.g., vehicle-mounted terminals, vehicle UEs (V-UEs)) that do not have restrictions on battery capacity. Therefore, a power saving issue may not be greatly considered in resource sensing/selection operations for such the terminals. However, in order to perform sidelink communication with terminals having restrictions on battery capacity in the sidelink communication system supporting Release-17 (e.g., a terminal carried by a pedestrian, a terminal mounted on a bicycle, a terminal mounted on a motorcycle, a pedestrian UE (P-UE)), power saving methods will be required. In the present disclosure, a 'V-UE' may refer to a terminal that has no significant restrictions on battery capacity, a 'P-UE' may refer to a terminal with restrictions on battery capacity, and a 'resource sensing/selection operation' may refer to a resource sensing operation and/or a resource selection operation. The resource sensing operation may refer to a partial sensing operation or a full sensing operation. The resource selection operation may refer to a random selection operation. In addition, in the present disclosure, an 'operation of a terminal' may be interpreted as an 'operation of a V-UE' and/or 'operation of a P-UE'.

For power saving in the LTE V2X, a partial sensing operation and/or a random selection operation has been introduced. When the partial sensing operation is supported, the terminal may perform resource sensing operations in partial periods instead of an entire period within a sensing window, and may select a resource based on a result of the partial sensing operation. According to such the operation, power consumption of the terminal may be reduced. When the random selection operation is supported, the terminal may randomly select a resource without performing the resource sensing operation. Alternatively, the random selection operation may be performed together with the resource sensing operation. For example, the terminal may determine resources by performing the resource sensing operation, and may select a resource(s) by performing the random selection operation within the determined resources.

In the LTE V2X supporting Release-14, a resource pool in which the partial sensing operation and/or random selection operation can be performed may be configured independently of a resource pool in which the full sensing operation can be performed. A resource pool capable of performing the random selection operation, a resource pool capable of performing the partial sensing operation, and a resource pool capable of performing the full sensing operation may be independently configured. The terminal may select resources by performing the random selection operation, the partial sensing operation, and/or the full sensing operation in the resource pool(s). The terminal may select one operation among the random selection operation and the partial sensing operation, may select a resource(s) by performing the selected sensing operation, and may perform sidelink communication by using the selected resource(s).

In the LTE V2X supporting Release-14, sidelink (SL) data may be periodically transmitted based on a broadcast scheme. In the NR communication system, SL data may be transmitted based on a broadcast scheme, multicast scheme, groupcast scheme, or unicast scheme. In addition, in the NR communication system, SL data may be transmitted periodically or aperiodically. A transmitting terminal may transmit SL data to a receiving terminal, and the receiving terminal may transmit a HARQ feedback (e.g., acknowledgement (ACK) or negative ACK (NACK)) for the SL data to the transmitting terminal on a PSFCH. In the present disclosure, a transmitting terminal may refer to a terminal transmitting SL data, and a receiving terminal may refer to a terminal receiving the SL data.

Hereinafter, methods for enhancing a terminal coverage in a communication system will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a transmitting terminal is described, a corresponding receiving terminal may perform an operation corresponding to the operation of the transmitting terminal. Conversely, when an operation of a receiving terminal is described, a corresponding transmitting terminal may perform an operation corresponding to the operation of the receiving terminal.

A terminal having reduced capability (hereinafter, referred to as a 'RedCap terminal') may operate in a specific usage environment. The capability of the RedCap terminal may be lower than the capability of a new radio (NR) normal (i.e., legacy) terminal, and may be higher than that of an LTE-machine type communication (LTE-MTC) terminal, a narrow band internet of things (NB-IoT) terminal, or a low power wide area (LPWA) terminal. For example, a terminal (e.g., surveillance cameras) that requires 'high data rate and non-high latency condition' and/or a terminal (e.g., wearable device) that requires 'non-high data rate, high latency condition, and high reliability' may exist. In order to support the above-described terminals, the maximum carrier bandwidth in FR1 may be reduced from 100 MHz to 20 MHz, and the maximum carrier bandwidth in FR2 may be reduced from 400 MHz to 100 MHz. The number of reception antennas of the RedCap terminal may be smaller than the number of reception antennas of the NR normal terminal. When the carrier bandwidth and the number of reception antennas are reduced, a reception performance of the RedCap terminal may decrease, and accordingly, the coverage of the RedCap terminal may decrease. Various methods for enhancing the coverage of the RedCap terminal will be proposed in the present disclosure. The RedCap terminal may refer to a RedCap UE, and the NR normal terminal may refer to a normal terminal or a normal UE.

Due to the reduction in complexity and/or the number of reception antennas of the RedCap terminal, the coverage of the RedCap terminal may decrease. In order to improve the coverage, an aggregation level (AL) may be increased to lower a code rate in a PDCCH transmission procedure. The above-described operations may not be suitable because the number of available control channel elements (CCEs) is not sufficient in the small bandwidth in which the RedCap terminal operates. The minimum code rate of a polar code used for an NR PDCCH may be ⅛, and an effect when a code rate lower than the minimum code rate is applied may be the same as that of a simple repetition code. For example, when a size of a payload of downlink control information (DCI) is about 40 bits and an AL greater than 4 is used, the polar code may operate in the same manner as a repetition code. Accordingly, the coverage (e.g., PDCCH transmission coverage) may be improved through PDCCH repetitions instead of increasing the AL within a limited control resource set (CORESET). A PDSCH scheduled by a PDCCH may be transmitted in the entire slot or in a plurality of slots through slot aggregation, unlike a PDCCH transmitted within a limited CORESET. Resources available for PDSCH transmission may be more abundant than resources available for PDCCH transmission. Accordingly, a method for improving the coverage by repeatedly transmitting a PDCCH scheduling a PDSCH or a group common PDCCH may be proposed. The repeated PDCCH transmission method may include a method of repeatedly transmitting a PDCCH within one slot (hereinafter referred to as a 'one-slot repeated transmission method') and a method of repeatedly transmitting a PDCCH in a plurality of slots (hereinafter referred to as a 'multi-slot repeated transmission method'). The repeated PDCCH transmission method may be configured by system information and/or RRC signaling (e.g., UE-specific RRC signaling).

The repeated PDCCH transmission method may be performed differently according to the type of PDCCH. In order to support the method of repeatedly transmitting a PDCCH within one slot (i.e., one-slot repeated transmission method), monitoring occasions of a plurality of search space sets may be configured within a slot, and the base station may transmit a plurality of PDCCHs in the monitoring occasions. The terminal may detect a plurality of PDCCHs by performing a PDCCH monitoring operation on the monitoring occasions, and may achieve a coverage enhancement effect through the plurality of PDCCHs. Alternatively, a plurality of CORESETs for PDCCH transmission may be configured, a search space set(s) associated with the plurality of CORESETs may be configured within a slot, and the base station may transmit a plurality of PDCCHs in search space set(s) associated with the plurality of CORESETs. The terminal may detect a plurality of PDCCHs by performing a PDCCH monitoring operation in the search space set(s) associated with the plurality of CORESETs, and may achieve a coverage enhancement effect through the plurality of PDCCHs.

In order to support the method of repeatedly transmitting a PDCCH in a plurality of slots (i.e., multi-slot repeated transmission method), monitoring occasions of search space sets may be configured within a plurality of slots, and the base station may transmit a plurality of PDCCHs in the monitoring occasions. The terminal may detect a plurality of PDCCHs by performing a PDCCH monitoring operation on the monitoring occasions, and may achieve a coverage enhancement effect through the plurality of PDCCHs. Alternatively, a plurality of CORESETs for PDCCH transmission may be configured, search space set(s) associated with the plurality of CORESETs may be configured within a plurality of slots, and the base station may transmit a plurality of PDCCHs in the search space set(s) associated with the plurality of CORESETs. The terminal may detect a plurality of PDCCHs by performing a PDCCH monitoring operation in the search space set(s) associated with the plurality of CORESETs, and may achieve a coverage enhancement effect through the plurality of PDCCHs.

Since a UE-specific PDCCH may be transmitted through a common search space (CSS) and/or a UE-specific search space (USS), both the one-slot repeated transmission method and the multi-slot repeated transmission method may be applied to a transmission procedure of a UE-specific PDCCH. In an exemplary embodiment, a CSS (or CSS set) may be configured in a front region or an arbitrary region within a slot, and a USS (or USS set) may be configured in a front region or an arbitrary region within a slot. For example, a CSS may be configured in a front region within a slot, and a USS may be configured in an arbitrary region within a slot. Alternatively, a CSS may be configured in an arbitrary region within a slot, and a USS may be configured in a front region within a slot. The aforementioned front region may include the first symbol within the slot, the first and second symbols within the slot, or the first, second, and third symbols within the slot.

Operations based on a CSS (or CSS set) configured in a front region within a slot may be applied to a CSS (or CSS set) configured in an arbitrary region within the slot. Conversely, operations based on a CSS configured in an arbitrary region within a slot may be applied to a CSS configured in a front region within the slot. Also, operations based on a USS (or USS set) configured in a front region within a slot may be applied to a USS (or USS set) configured in an arbitrary region within the slot. Conversely, operations based on a USS configured in an arbitrary region within a slot may be applied to a USS configured in a front region within the slot.

When a CSS is configured in three symbols (e.g., front region) from the first symbol within a slot, it may be preferable to apply the multi-slot repeated transmission method to a common PDCCH transmitted only through a CSS. In order to repeatedly transmit a common PDCCH within a slot, a CORESET composed of one symbol may be configured, and monitoring occasions of a CSS associated with the CORESET may be configured in three symbols from the first symbol within the slot. That is, when the above-described configuration is supported, the one-slot repeated transmission method may be applied to a transmission procedure of a common PDCCH. Alternatively, a CORESET composed of two symbols may be configured, and CORESETs may be configured to overlap each other. Alternatively, it may be allowed to configure monitoring occasions for a CSS in the entire region rather than the front region of the slot, and in this case, the one-slot repeated transmission method may be applied to a transmission procedure of a common PDCCH.

In order to achieve improved performance through repeated PDCCH transmissions, a soft-combining operation between the repeated PDCCHs may be configured to be easily performed. In order to support this operation, mapping positions, scramble sequences, and/or demodulation-reference signal (DM-RS) mapping schemes of the subsequent PDCCHs may be maintained identically based on the first PDCCH among the repeated PDCCHs. Alternatively, the mapping positions, scramble sequences, and/or DM-RS mapping schemes of the subsequent PDCCHs may be easily derived based on the first PDCCH among the repeated PDCCHs. Based on the first PDCCH among the repeated N PDCCHs, the subsequent PDCCHs may be mapped to the same CCEs in each PDCCH resource region. Alternatively, based on the first PDCCH among the repeated N PDCCHs, the subsequent PDCCHs may be mapped to CCEs according to a specific criterion in consideration of the number of performed repeated transmissions. For example, in a CCE mapping procedure of the PDCCHs, a value obtained by multiplying the number of performed repeated PDCCH transmissions by a specific offset may be added. Specifically, since a position of CCEs for a CSS (e.g., fixed position) may be determined according to the AL, the same position of CCEs according to the same AL may be secured for each PDCCH resource region. The CCE mapping position of a USS within one CORESET may be determined by a function of a cell-radio network temporary identifier (C-RNTI) and a slot index. Therefore, when a plurality of PDCCHs are repeatedly transmitted within one slot, the same CCE position may be secured for each PDCCH resource region because a slot index does not change.

When a plurality of PDCCHs are repeatedly transmitted within a plurality of slots, a position of candidate CCEs for PDCCH transmission within the same CORESET may vary according to a change in a slot index. In order to prevent the position of the candidate CCEs from being changed, a CCE mapping position of a USS may be determined in the same manner as the CSS instead of a function of a C-RNTI and a slot. Alternatively, a USS may be mapped to CCEs according to a separate equation. In this case, a USS (e.g., USS for the subsequent PDCCH of the first PDCCH) may be mapped to CCEs according to a specific criterion based on the first PDCCH. Here, the CCE mapping position of the first PDCCH may be determined by a function of a C-RNTI and a slot index based on the conventional scheme.

In order to easily perform a soft combining operation between repeated PDCCHs, the same scrambling sequence may be applied. $n_{ID}$ and $n_{RNTI}$ for initialization of a scrambling sequence for a CSS may be set to a cell ID and 0, respectively. $n_{ID}$ and $n_{RNTI}$ for initialization of a scrambling sequence for a USS may be identically set by higher layer parameters. Alternatively, $n_{ID}$ and nRNTI for initialization of a scrambling sequence for a USS may not be set by higher layer parameters. According to the above-described configuration, a USS may be applied in the same manner as a CSS. When a non-interleaved scheme is used in a CCE-to-resource element group (REG) mapping procedure, a soft combining operation between PDCCHs may be easily performed. When a soft combining operation is applicable to the repeated PDCCHs, the remaining PDCCH(s) excluding the first PDCCH among the repeated PDCCHs may not be included in the number of times blind decoding performed within the slot.

When PDCCHs are repeatedly transmitted, it may be preferable that DM-RS mapping between PDCCH resource regions remains the same. When the DM-RS mapping between PDCCH resource regions is maintained the same, joint channel estimation may be performed by using DM-RSs in the PDCCH resource regions together regardless of the one-slot repeated transmission method and the multi-slot repeated transmission method, and channel estimation performance may be improved by the joint channel estimation operation. Accordingly, PDCCH reception performance may be improved. If mapping positions of actual PDCCHs repeatedly transmitted are not maintained the same between the PDCCH resource regions, it may be preferable to set a precoding granularity of the DM-RSs to a wideband (i.e., allContiguousRBs) to facilitate the joint channel estimation operation. In order to perform the joint channel estimation operation, the same transmission beam and precoding may be applied for the PDCCH resource regions. Accordingly, the base station may maintain the same configuration of the transmission beam and precoding in the PDCCH resource regions to enable the joint channel estimation operation, and may signal the corresponding configuration to the terminal using a specific indication. In this case, the specific indication may be transmitted using at least one of cell-specific RRC signaling, UE-specific RRC signaling, DCI, and combinations thereof.

When PDCCHs are repeatedly transmitted, it may be preferable to limit ALs available for each PDCCH transmission. Considering the number of repeated PDCCH transmissions, available ALs may be limited so that the number of CCEs used for the repeated PDCCHs is greater than the maximum number of CCEs available for one PDCCH transmission. For example, transmitting a PDCCH four times using an AL 4 may be using 16 CCEs, and there may not be a difference between a performance of the above operation and a performance of an operation of transmitting a PDCCH once using an AL 16. Accordingly, it may be preferable to use an AL larger than the AL 4 in each PDCCH transmission procedure. When the maximum number of CCEs available for one PDCCH transmission is $\max_{CCE}$, an AL used in a procedure of repeatedly transmitting a PDCCH N times may be equal to or greater than ceil($\max_{CCE}$/N).

When a PDCCH is repeatedly transmitted to improve a coverage of the PDCCH, improved performance may be secured by guaranteeing the number of repeated transmissions of the PDCCH. When the one-slot repeated transmission method or the multi-slot repeated transmission method is used, some PDCCHs may not be transmitted according to a slot format. For example, when the number of downlink symbols and/or flexible symbols capable of transmitting PDCCHs is insufficient in the one-slot repeated transmission method or the multi-slot repeated transmission method, some PDCCHs may not be transmitted. In this case, transmission of the corresponding PDCCH(s) may be dropped, and the base station may repeatedly transmit the remaining PDCCH(s). For example, if it is difficult to transmit PDCCH(s) within M PDCCH transmission regions among PDCCH transmission regions configured for N repeated transmissions of the PDCCH, the base station may drop transmission of PDCCH(s) within the M PDCCH transmission regions. That is, the base station may repeatedly transmit the PDCCH (N-M) times. Each of N and M may be a natural number. When the PDCCH is not transmitted by the preset number (i.e., N) of repeated PDCCH transmissions, the transmission coverage of the PDCCH may be reduced. In the present disclosure, methods for guaranteeing N repeated transmissions when N repeated transmissions of the PDCCH are configured may be proposed.

When a PDCCH is repeatedly transmitted N times, an order of each PDCCH among the N repeated transmissions may be identified based on a DM-RS sequence of each PDCCH, and the N repeated transmissions of the PDCCH may be guaranteed based on results of the identification. Specifically, in a PDCCH DM-RS sequence initialization procedure, an index according to the number of repeated PDCCH transmissions performed so far may be further considered. A PDCCH DM-RS may be generated differently according to the number of repeated transmissions performed up to now. By detecting a PDCCH DM-RS, the terminal may identify an order of a PDCCH transmission associated with the PDCCH DM-RS among the total repeated transmissions, and a reception coverage of the PDCCH may be improved by the repeated PDCCHs. It may be preparable to indicate that the repeated PDCCHs are the same PDCCH. It may be preferable to facilitate detection of a PDCCH within a PDCCH resource region. Accordingly, a mapping position of a PDCCH in a PDCCH resource region may be fixed based on the first PDCCH. Alternatively, a PDCCH may be mapped in a PDCCH resource region according to a preset criterion. In order to guarantee a detection performance of the number of repeated transmissions performed so far, the length of the PDCCH DM-RS sequence may be set sufficiently long. For example, it may be preferable to set a precoding granularity of the PDCCH DM-RS to a wideband (i.e., allContiguousRBs). The above-described exemplary embodiment may be equally or similarly applied not only to a PDCCH but also to a PUCCH. In this case, a PUCCH DM-RS sequence initialization operation may be performed equally or similarly to the above-described PDCCH DM-RS sequence initialization operation.

As another method for identifying an order of a PDCCH transmission, PDCCH contents may include an index indicating the number of repeated PDCCH transmissions performed up to now. When N repeated transmissions of the PDCCH are configured, ceil(log 2(N)) bits may be added to the PDCCH to indicate the number of repeated PDCCH transmissions up to now. The ceil(log 2(N)) bits included in the PDCCH may indicate the number of repeated transmissions performed so far among the N repeated transmissions. In order to easily perform a soft combining operation of repeated PDCCHs, it may be preferable not to apply scrambling to the bits indicating information (e.g., index) indicating the number of repeated PDCCH transmissions performed so far.

Until additional PDSCH time domain resource configuration is received through RRC signaling, a PDCCH scheduling system information and/or a group-common PDCCH, which is transmitted through a CSS, may include a default PDSCH time domain resource configuration. In the default PDSCH time domain resource configuration, a slot offset $K_0$ between the PDCCH and a PDSCH scheduled by the PDCCH may be set to 0 except for a non-slot-based scheduling. When the one-slot repeated transmission method is used, resources for PDSCH transmission may not be sufficient considering resources for the repeated PDCCH transmissions within one slot. Accordingly, in the default PDSCH time domain resource configuration, $K_0$ may be set to a value greater than 0 even when non-slot-based scheduling is not performed.

When the multi-slot repeated transmission method is used, it may be preferable that the terminal interprets the scheduling information based on the last PDCCH. When the slot offset $K_0$ between the PDCCH and the PDSCH is applied, the terminal may receive the PDSCH by applying $K_0$ based on the last PDCCH. Therefore, there is a need for a method for determining the last PDCCH among the repeated PDCCHs. The terminal may identify the last PDCCH among the repeated PDCCHs based on information indicating the number of repeated PDCCH transmissions performed so far. Alternatively, the last PDCCH among the repeated PDCCHs may be indicated through separate signaling, and the terminal may identify the last PDCCH based on the separate signaling. For example, an indication indicating the last PDCCH may be added to PDCCH DM-RS sequence initialization for the last PDCCH. In this case, the last PDCCH may be distinguished from other PDCCHs.

In a communication system where a normal terminal and a RedCap terminal coexist, when a PDSCH is scheduled based on the last PDCCH among the repeated PDCCHs and an additional indication for detecting the last PDCCH is applied, the normal terminal may not detect the corresponding PDCCH (e.g., the last PDCCH). Therefore, when a PDCCH is repeatedly transmitted N times, it may be preferable to add an indication for the RedCap terminal to the first PDCCH. The RedCap terminal may detect the first PDCCH among the N repeated PDCCHs based on the above-mentioned indication, and then may obtain control information through the (N−1) repeated PDCCHs. Since the last PDCCH can be received by both the normal terminal and the RedCap terminal, the normal terminal may detect only the last PDCCH and obtain control information through the last PDCCH.

Alternatively, an indication indicating an order of a PDCCH among the N repeated PDCCHs may exist separately. In this case, the last PDCCH may have a PDCCH form of the normal terminal, and (N−1) PDCCHs before the last PDCCH may include the indication indicating the order of the corresponding PDCCH.

Specifically, when the number of repeated PDCCH transmissions up to now is indicated by the PDCCH DM-RS sequence initialization, an index (i.e., max) indicating the number of repeated transmissions so far may be added to $c_{init}$, which is an equation for the PDCCH DM-RS sequence initialization. That is, $c_{init}+n_{idx}$ may be generated. The value of max according to the number of repeated PDCCH transmissions up to now may be set as shown in Table 3 below. That is, the value of max may be set opposite to the number of repeated PDCCH transmissions so far.

TABLE 3

| $n_{idx}$ | Repeated PDCCH transmissions so far |
| --- | --- |
| N-1 | 0 |
| N-2 | 1 |
| ... | ... |
| 1 | N-2 |
| 0 | N-1 |

In this case, the first PDCCH may be detected using '$n_{idx}$=N−1' and the last PDCCH may be detected using '$n_{idx}$=0'. In the case of '$n_{idx}$=0', since the equations of the PDCCH DM-RS sequence initialization are the same in the normal terminal and the RedCap terminal, both the normal terminal and the RedCap terminal may receive the last PDCCH. The RedCap terminal may identify the last PDCCH based on the PDCCH DM-RS. The number of repeated PDCCH transmissions up to now may be indicated by reserved bits of the corresponding PDCCH. The normal terminal may ignore the reserved bits of the PDCCH, and the RedCap terminal may identify the order of the PDCCH among the repeated PDCCH transmissions based on the reserved bits of the PDCCH.

As another method for improving a PDCCH coverage problem of the RedCap terminal, a method of transmitting a PDSCH without a PDCCH may be proposed. A method of transmitting a PDSCH without a PDCCH containing various control information including scheduling information may be suitable for transmitting various system information including a periodically transmitted system information block (e.g., SIB1). When the RedCap terminal and the normal terminal perform common initial access procedures, since a separate system information transmission procedure is not required, the efficiency of resources may be improved. When the number of RedCap terminals is large, it may be efficient to perform separate initial access procedures for the RedCap terminals. When a separate initial access procedure is performed, which is distinct from the initial access procedure for the conventional terminal, a method in which scheduling information for SIB1 is transmitted through a PBCH may be proposed. In this case, the scheduling information included in the PBCH may be information included in a DCI format 1_0 (e.g., resource configuration information and/or modulation and coding scheme (MCS)). Alternatively, the scheduling information included in the PBCH may include an index of a specific candidate list among candidate lists for preconfigured scheduling information.

As a method of transmitting system information (SI) message(s) without a PDCCH, a method of including scheduling information for the SI message(s) in the SIB1 may be proposed. The SIB1 may include at least one of information included in each SI message, a length of a SI-window in which the SI message is transmitted, or a transmission periodicity of the SI message. In addition, the SIB1 may further include specific scheduling information (e.g., resource configuration information and/or MCS) for each SI message. In this case, the scheduling information included in the SIB1 may be information (e.g., resource configuration information and/or MCS) included in the DCI format 1_0. Alternatively, the scheduling information included in the SIB1 may include an index of a specific candidate list among candidate lists for preconfigured scheduling information.

As another method of transmitting SI message(s) without a PDCCH, an MCS applied to the SI message(s) may be set to be the same as an MCS applied to the SIB1, and transmission resources for the SI message(s) may be set to be proportional to transmission resources for the SIB1. Time domain resources of the SI message(s) may be maintained the same as time domain resources of the SIB1, and frequency domain resources of the SI message(s) may be adjusted based on frequency domain resources of the SBI1. The frequency domain resources of the SI message may be adjusted in proportion to a payload size of the SI message based on the frequency domain resources of the SIB1. For example, when the payload size of the SIB1 is $SIB1_{size}$, the number of RBs for transmitting the SIB1 is $SIB1_{RB}$, and the payload size of an SI message X is $SI_{X_{size}}$, the required number $SI_{X_{RB}}$ of RBs for transmission of the SI message X may be determined based on Equation 1 below.

$$SI_{X_{RB}} = \text{ceil}\left(\frac{SI_{X_{size}}}{SIB1_{size}} \times SIB1_{RB}\right) \qquad \text{[Equation 1]}$$

A starting position of the frequency domain resources of the SI message may be set to be the same as a starting position of the frequency domain resources of the SIB1, and the size of the frequency domain resources of the SI message may be adjusted based on the starting position. The size of the frequency domain resources of the SI message may be simultaneously adjusted to both sides around the frequency position of the SIB1. For accurate calculation, payload size information of each SI message may be included in the SIB1. Even when it is assumed that the time domain resources of the SI message and SIB1 are the same, a slot in which the SIB1 is transmitted may be different from a slot in which the SI message X is transmitted according to actual slot format configuration.

Accordingly, a method of increasing or decreasing the frequency domain resources of the SI message X by RBs corresponding to $delta_{RB}$ may be proposed in consideration that the slot in which the SIB1 is transmitted and the slot in which the SI message X is transmitted are different according to the slot format configuration. For example, when the time domain resources of the SIB1 are configured with 14 symbols and the time domain resources of the SI message X are configured with 12 symbols, one or more RBs corresponding to the reduced number of symbols (e.g., 2) may be added to the frequency domain resources of the SI message X. For another example, when the time domain resources of the SIB1 are configured with 12 symbols and the time domain resources of the SI message X are configured with 14 symbols, one or more RBs corresponding to the increased number of symbols (e.g., 2) may be excluded from the frequency domain resources of the SI message X. The above-described method may be defined as in Equation 2 below.

$$SI_{X_{RB}} = \text{ceil}\left(\frac{SI_{X_{size}}}{SIB1_{size}} \times SIB1_{RB}\right) + delta_{RB} \qquad \text{[Equation 2]}$$

Alternatively, one RB (e.g., 12 subcarriers) in the frequency domain and one symbol in the time domain may be defined as one resource unit. The number of resource units occupied by a PDSCH transmitting the SIB1 may be denoted by $SIB1_{RU}$, and the number $SI_{X_{RU}}$ of resource units occupied by a PDSCH transmitting the SI message X may be determined based on Equation 3 below.

$$SI_{X_{RU}} = \text{ceil}\left(\frac{SI_{X_{size}}}{SIB1_{size}} \times SIB1_{RU}\right) \qquad \text{[Equation 3]}$$

When the number of available symbols in the slot in which the SI message X is transmitted is denoted by $SI_{X_{sym}}$, the size $SI_{X_{RB}}$ of RBs for the SI message X in the frequency domain may be determined based on Equation 4 below.

$$SI_{X_{RB}} = \text{ceil}\left(\frac{SI_{X_{RU}}}{SI_{X_{sym}}}\right) \qquad \text{[Equation 4]}$$

The size of time and frequency domain resources of the PDSCH for transmission of the SI message X may be set based on a ratio of the payload size of the SIB1 to the payload size of the SI message X and the size of the time and frequency domain resources of the PDSCH for transmission of the SIB1. Accordingly, the terminal may receive the corresponding SI message(s) without receiving a PDCCH scheduling the SI message(s). When a system bandwidth for the RedCap terminal is not large, the size adjustment of the frequency domain resources for the SI message(s) may be limited. In this case, the size of the frequency domain resources of the SI message(s) may be fixed, and the time domain resources of the SI message(s) may be set in consideration of the ratio of the payload sizes according to the above-described method. When the time domain resources required for transmission of the SI message(s) exceeds one slot, the PDSCH including the SI message(s)

may be transmitted in a plurality of slots. That is, multi-slot scheduling may be configured for the SI message(s). A resource configuration method in consideration of the ratio of the payload sizes of the SI messages may be simultaneously applied for configuring the size of the time and frequency domain resources.

The RedCap terminal may perform the same initial access procedure as the normal terminal. In this case, the resource configuration information may be fixed in advance. Alternatively, the RedCap terminal and the normal terminal may receive the SIB1 in the same manner, and the RedCap terminal may receive the SI message(s) based on information included in the SIB1 according to the above-described method. In this case, although the normal terminal receives scheduling information of the SI message(s) through a PDCCH, the normal terminal may receive the SI message(s) scheduled by a predefined method in the same manner as the RedCap terminal. Accordingly, scheduling efficiency may be degraded.

Scheduling of system information (e.g., SI message(s)) for the normal terminal and scheduling of system information for the RedCap terminal may be performed independently. In this case, since a scheduling DCI for system information for each of the normal terminal and the RedCap terminal is transmitted, a transmission overhead of the scheduling DCI may increase. In order to solve the above-described problem, a method in which one DCI schedules both system information for the normal terminal and system information for the RedCap terminal will be proposed when separate system information for the RedCap terminal is transmitted. Here, the DCI may be basically used for scheduling of the system information for the normal terminal, and the scheduling information of the system information for the RedCap terminal may be added to the DCI. In an exemplary embodiment, the scheduling information for the normal terminal may be referred to as 'normal scheduling information', and the scheduling information for the RedCap terminal may be referred to as 'RedCap scheduling information'.

Specifically, the DCI format 1_0 may schedule the normal system information and may be scrambled by an SI-RNTI. Reserved bits (e.g., 15 bits) of the DCI format 1_0 may be configured as scheduling information of the RedCap system information. The number of reserved bits for the RedCap system information may be smaller than the number of bits required for scheduling of the normal system information. Therefore, the scheduling information of the RedCap system information may be configured in consideration of the number of reserved bits. In the present disclosure, a method for scheduling the RedCap system information by using reserved bits of DCI for scheduling the normal system information will be proposed.

Since the number of reserved bits included in the DCI is not sufficient, one or more information elements among the scheduling information of the RedCap system information may be indicated by a relative offset with respect to the scheduling information of the normal system information. Time domain resource assignment information (e.g., time domain scheduling information) and VRB-to-PRB mapping information in the scheduling information of the normal system information may be used as scheduling information of the RedCap system information. In this case, time domain resource allocation information and VRB-to-PRB mapping information for scheduling of the RedCap system information may not be separately signaled. Scheduling information of the normal system information may be used as redundancy information for the RedCap terminal. In this case, the redundancy information for the RedCap terminal may not be separately signaled. Alternatively, in order to improve scheduling flexibility, the redundancy information for the RedCap terminal may be signaled separately.

The scheduling information of the normal system information may be used as a system information indicator of the RedCap terminal. In this case, the system information indicator of the RedCap terminal may not be separately signaled. Alternatively, in order to improve the flexibility of scheduling and resource use, a separate system information indicator for the RedCap terminal may be used. The size of the corresponding system information indicator may be 1 bit.

The frequency domain resource allocation information for scheduling of the RedCap system information may be indicated in the same manner as the frequency domain resource allocation information for scheduling of the normal system information. When the number of reserved bits in the DCI is not sufficient, a simple signaling method may be used to indicate the frequency domain resource allocation information for scheduling of the RedCap system information. The frequency domain resources for transmission of the RedCap system information may be allocated to be adjacent to the frequency domain resources for transmission of the normal system information. In this case, the frequency domain resource allocation information for scheduling of the RedCap system information may include first information and second information. The first information may indicate a position of the frequency domain resources for transmission of the RedCap system information based on the frequency domain resources for transmission of the normal system information. The size of the first information may be 1 bit, and the first information set to a first value (e.g., 0) may indicate that the frequency domain resources for transmission of the RedCap system information is located below the frequency domain resources for transmission of the normal system information, and the first information set to a second value (e.g., 1) may indicate that the frequency domain resources for transmission of the RedCap system information is located above the frequency domain resources for transmission of the normal system information. The second information may indicate the size (e.g., the number of RBs) of the frequency domain resources for transmission of the RedCap system information.

The number of bits required when scheduling the frequency domain resources for transmission of the RedCap system information based on the above-described method may be smaller than the number of bits required when scheduling the frequency domain resources for transmission of the RedCap system information based on the conventional method. For example, if the size of the frequency domain resources allocated for transmission of the RedCap system information is 96 RBs, 13 bits may be required to schedule the frequency domain resources for the RedCap terminal when using the conventional method, and 8 bits may be required to schedule the frequency domain resources for the RedCap terminal when using the above-described method (i.e., combination of the first information and the second information). Among 8 bits, 1 bit may indicate the position of the frequency domain resources, and 7 bits may indicate the size (e.g., number of RBs) of the frequency domain resources. The frequency domain resources having a maximum of 128 RBs may be indicated by using 8 bits. In this case, if the minimum number of RBs is set to a value greater than 0, the number of bits required for scheduling the frequency domain resources for the RedCap terminal may be further reduced.

MCS information for transmission of the normal system information may be used as MCS information for transmission of the RedCap system information. Alternatively, the MCS information for transmission of the RedCap system information may be separately signaled in consideration of characteristics of the RedCap system information. In order to reduce the number of bits required to indicate the MCS information, the MCS information for transmission of the RedCap system information may be expressed as an offset (hereinafter referred to as 'MCS offset') to the MCS information for transmission of the normal system information. The RedCap terminal may determine MCS information for transmission of the RedCap system information by applying the MCS offset to the MCS information for transmission of the normal system information. When the MCS offset is applied, an MCS level (e.g., MCS index) for transmission of the RedCap system information may be set as shown in Table 4 below. That is, the MCS offset may be set to 0, '−offset', or '+ offset'.

TABLE 4

| MCS offset | MCS level |
| --- | --- |
| 0 | MCS level for transmission of RedCap system information = MCS level for transmission of normal system information |
| − | MCS level for transmission of RedCap system information < MCS level for transmission of normal system information |
| + | MCS level for transmission of RedCap system information > MCS level for transmission of normal system information |

The MCS offset may be set in reserved bit(s) of the DCI. In order to reduce the number of bits required for signaling of the MCS offset, an application range of the MCS offset may be limited. Specifically, the complexity of the RedCap terminal may be lower than that of the normal terminal, and the reception coverage of the RedCap terminal may be shorter than the reception coverage of the normal terminal. To solve this problem, the MCS level for the RedCap terminal may be set lower than the MCS level for the normal terminal. Accordingly, the MCS offset may be set to 0 or '−offset'. That is, the MCS offset may not indicate '+ offset'. In this case, the number of bits required for signaling of the MCS offset may be reduced. Alternatively, the range of the MCS offset may be preset, and the base station may inform the terminal(s) of the preset range for the MCS offset.

Figure 10:
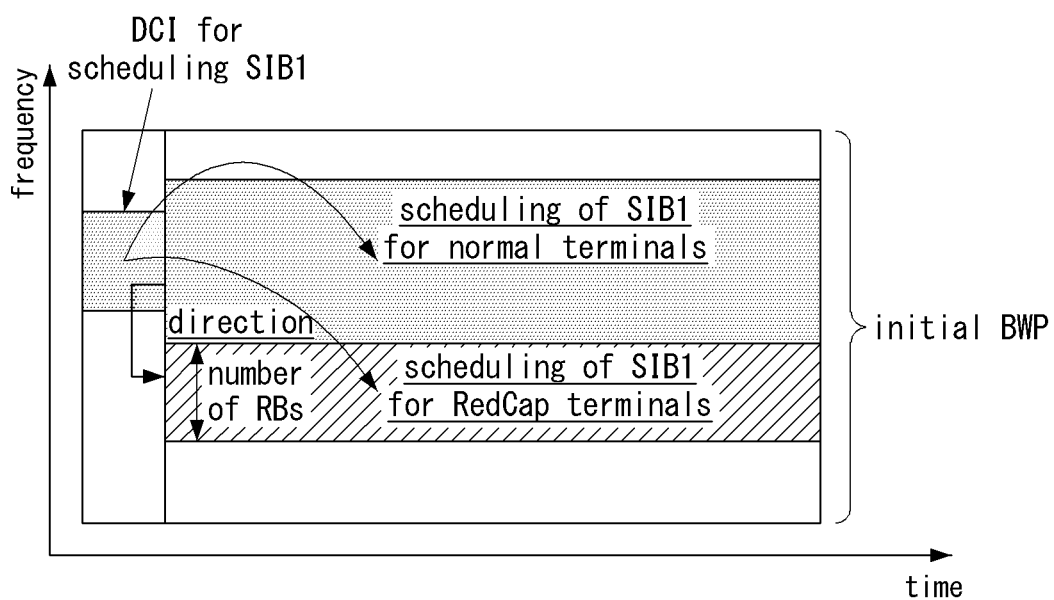
FIG. 10 is a conceptual diagram illustrating a first exemplary embodiment of a method for scheduling frequency resources for a RedCap SIB1.

FIG. 10 is a conceptual diagram illustrating a first exemplary embodiment of a method for scheduling frequency resources for a RedCap SIB1.

Referring to FIG. 10, a RedCap SIB1 may be SIB1 for RedCap terminal(s), and a normal SIB1 may be SIB1 for normal terminal(s). Frequency domain resources of the RedCap SIB1 may be indicated by a combination of first information and second information. The first information may indicate a position of frequency resources for the RedCap SIB1 based on frequency resources (e.g., frequency region) for the normal SIB1. The first information may be set as '+ indication' or '− indication'. The '+ indication' may indicate that the frequency resources for the RedCap SIB1 is allocated above the frequency resources for the normal SIB1. The '− indication' may indicate that the frequency resources for the RedCap SIB1 is allocated below the frequency resources for the normal SIB1. The second information may indicate the size (e.g., the number of RBs) of the frequency resources for the RedCap SIB1.

In the frequency domain, the frequency resources for the RedCap SIB1 may be allocated below the frequency resources for the normal SIB1. In this case, the first information may mean '− indication', and only the second information indicating the size of the frequency resources for the RedCap SIB1 may be signaled. Frequency resources for other RedCap system information other than RedCap SIB1 may be allocated/indicated similarly or in the same manner as in FIG. 10.

The RedCap terminal and the normal terminal may perform the same initial access procedure. Alternatively, the RedCap terminal may perform a separate initial access procedure different from that of the normal terminal. If the base station can distinguish the RedCap terminal from the normal terminal in the initial access procedure, the communication system may be efficiently operated. For example, when a large number of terminals are concentrated in the base station, the RedCap terminal(s) may be blocked from performing the initial access procedure in advance for smooth services. That is, the base station may temporarily suspend the services for the RedCap terminal(s), and may focus on the services for the normal terminal(s). Therefore, in the present disclosure, a separate initial access procedure for the RedCap terminal (hereinafter referred to as 'RedCap initial access procedure') and/or a method of distinguishing the RedCap terminal from the normal terminal in the initial access procedure will be proposed. In the exemplary embodiments, the initial access procedure for the normal terminal may be referred to as a 'normal initial access procedure', and the initial access procedure for both the normal terminal and the RedCap terminal may be referred to as a 'common initial access procedure'. In the exemplary embodiments, 'a first communication node (e.g., base station) sets parameters (e.g., information elements)' or 'parameters are set' may mean 'the first communication node transmits configuration information of the parameters a second communication node (e.g., terminal)'.

In the common initial access procedure, the base station may allocate a physical random access channel (PRACH) preamble for the normal terminal(s) and a PRACH preamble for the RedCap terminal(s) differently. In this case, the base station may distinguish the normal terminal from the RedCap terminal based on the PRACH preamble in the common initial access procedure. Specifically, the base station may separately signal configuration information of the PRACH preamble(s) (e.g., the number, indexes, and/or group of PRACH preambles) for the RedCap terminal(s). The RedCap terminal may perform an initial access procedure based on the configuration information of the PRACH preamble(s) signaled by the base station. In this case, the base station may distinguish between the normal terminal and the RedCap terminal. The normal terminal may perform a type-1 random access procedure (e.g., 4-step random access procedure) or a type-2 random access procedure (e.g., 2-step random access procedure). A PRACH preamble for the type-1 random access procedure may be configured differently from a PRACH preamble for the type-2 random access procedure.

A RACH occasion (OR) for the type-1 random access procedure (hereinafter referred to as 'type-1 RO') and a RO for the type-2 random access procedure (hereinafter referred to as 'type-2 RO') may be configured independently. In this case, R PRACH preambles may be configured to the terminal for each valid RO (e.g., valid type-1 RO and/or valid type-2 RO). In this case, R (hereinafter referred to as 'R1') for the type-1 random access procedure may be different from R (hereinafter referred to as 'R2') for the type-2 random access procedure. For example, when one SSB is mapped to one or more ROs, R1 PRACH preambles may be configured for a valid type-1 RO, and R2 PRACH preambles may be configured for a valid type-2 RO. In this case, indexes of the PRACH preambles may start from 0.

When N SSBs are mapped to one RO, R (e.g., R1 and/or R2) may be set within a value obtained by dividing the total number $N_{tot}$ of PRACH preambles for the corresponding RO by N. N may be a natural number. The first SSB among the N SSBs may be mapped to PRACH preambles 0 to R−1, and the second SSB among the N SSBs may be mapped to PRACH preambles $N_{tot}/N$ to $N_{tot}/N+R-1$. As the SSB index increases, the starting point of the PRACH preamble index may increase by $N_{tot}/N$.

A common RO for the type-1 random access procedure and the type-2 random access procedure may be configured. In this case, R PRACH preambles for the type-1 random access procedure and Q PRACH preambles for the type-2 random access procedure may be configured for each valid common RO. Each of R and Q may be a natural number. The R PRACH preambles and the Q PRACH preambles may be contiguously configured. For example, when one SSB is mapped to one or more ROs, R PRACH preambles for the type-1 random access procedure are configured, and Q PRACH preambles for the type-2 random access procedure are configured, R PRACH preambles for the type-1 random access procedure (e.g., PRACH preambles 0 to R−1) and Q PRACH preambles for the type-2 random access procedure (e.g., PRACH preambles R to R+Q−1) may be configured for each common RO (e.g., valid common RO).

When N SSBs are mapped to one RO, each of R and Q may be set within a value obtained by dividing the total number $N_{tot}$ of PRACH preambles for the corresponding RO by N. N may be a natural number. The first SSB among the N SSBs may be mapped to the PRACH preambles 0 to R−1 for the type-1 random access procedure and the PRACH preambles R to R+Q−1 for the type-2 random access procedure. The second SSB among the N SSBs may be mapped to PRACH preambles $N_{tot}/N$ to $N_{tot}/N+R-1$ for the type-1 random access procedure and PRACH preambles $N_{tot}/N+R$ to $N_{tot}/N+R+Q-1$ for the type-2 random access procedure. As the SSB index increases, the starting point of the PRACH preamble indexes may be set to increase by $N_{tot}/N$.

A separate PRACH preamble(s) (hereinafter, referred to as 'RedCap PRACH preamble(s)') for the RedCap terminal may be configured. A method of configuring the RedCap PRACH preambles when an RO for each of the type-1 random access procedure and the type-2 random access procedure is configured may be different from a method of configuration the RedCap preambles when a common RO is configured for the type-1 random access procedure and the type-2 random access procedure. When an RO for each of the type-1 random access procedure and the type-2 random access procedure is configured, P RedCap PRACH preambles may be configured based on an additional parameter P for each RO. PRACH preambles 0 to R−1 may be used for the type-1 random access procedure or the type-2 random access procedure, and PRACH preambles R to R+P−1 may be configured as the RedCap PRACH preambles.

In the type-1 random access procedure, P for the RO may be set to P1, and in the type-2 random access procedure, P for the RO may be set to P2. P1 may be different from P2. Alternatively, the same P may be applied to both the RO of the type-1 random access procedure and the RO of the type-2 random access procedure. When the RedCap PRACH preamble(s) are additionally configured for the RO of the type-1 random access procedure, the RedCap terminal may perform the type-1 random access procedure. When the RedCap PRACH preamble(s) are additionally configured for the RO of the type-2 random access procedure, the RedCap terminal may perform the type-2 random access procedure.

When a common RO is configured for the type-1 random access procedure and the type-2 random access procedure, P RedCap PRACH preambles may be configured for the common RO by using the additional parameter P. For each common RO, PRACH preambles 0 to R−1 for the type-1 random access procedure, PRACH preambles R to R+Q−1 for the type-2 random access procedure, and RedCap PRACH preambles R+Q to R+Q+P−1 may be configured. In this case, it may be preconfigured for the RedCap terminal to perform the type-1 random access procedure or the type-2 random access procedure. It may be necessary to configure the RedCap PRACH preamble(s) for each of the type-1 random access procedure and the type-2 random access procedure in the common RO. In this case, P RedCap PRACH preambles for the type-1 random access procedure may be configured using the parameter P, and O RedCap PRACH preambles for the type-2 random access procedure may be configured using a parameter O. In this case, for each common RO, PRACH preambles 0 to R−1 for the type-1 random access procedure, PRACH preambles R to R+Q−1 for the type-2 random access procedure, RedCap PRACH preambles R+Q to R+Q+P−1 for the type-1 random access procedure, and RedCap PRACH preambles R+Q+P to R+Q+P+O−1 for the type-2 random access procedure may be configured.

When N SSBs are mapped to one RO, PRACH preamble indexes may be defined within a value obtained by dividing the total number $N_{tot}$ of PRACH preambles for the corresponding RO by N. As the SSB index increases, the starting point of the PRACH preamble indexes may increase by $N_{tot}/N$. Enabling and/or disabling of an operation of distinguishing the normal terminal(s) from the RedCap terminal(s) through configuration of the RedCap PRACH preamble(s) may be configured by system information. Parameter(s) for configuring the RedCap PRACH preamble(s) may be signaled through system information.

As another method for distinguishing between the normal terminal(s) and the RedCap terminal(s) in the common initial access procedure, a starting position of RO(s) for the normal terminal(s) (hereinafter, referred to as 'normal RO') and a starting position of RO(s) for the RedCap terminal(s) (hereinafter, referred to as 'RedCap RO') may be configured differently from each other in the frequency domain. In order to configure the normal RO(s) and the RedCap RO(s) differently, the base station may separately configure the starting position of the RedCap RO(s) in the frequency domain in units of RBs by using an additional parameter. When the RedCap terminal supports both the type-1 random access procedure and the type-2 random access procedure, a frequency domain starting position of the RedCap RO(s) for each of the type-1 random access procedure and the type-2 random access procedure may be configured in units of RBs. The frequency domain starting position of the RedCap RO(s) and the number of RedCap RO(s) in the frequency domain may be configured together.

In order to distinguish the normal RO(s) from the RedCap RO(s), a starting position of the normal RO(s) and a starting position of the RedCap RO(s) may be set differently in the time domain. The position of the RO(s) in the time domain may be determined by a PRACH configuration index. The PRACH configuration index may be set so that the normal RO(s) and the RedCap RO(s) do not overlap in the time domain. In this case, the base station may distinguish between the normal terminal(s) and the RedCap terminal(s). A combination of at least one of a method of setting the starting positions of the normal RO(s) and the RedCap RO(s) differently in the frequency domain or a method of setting the normal RO(s) and the RedCap RO(s) so that they do not overlap in the time domain may be applied. Enabling and/or disabling of an operation of distinguishing the normal terminal(s) from the RedCap terminal(s) through configuration of the RedCap RO(s) (e.g., separate RACH resources for the RedCap terminal(s)) may be configured by system information. Parameter(s) for configuring the RedCap RO(s) may be signaled to the terminal(s) through system information.

Alternatively, in the type-1 random access procedure, the normal terminal and the RedCap terminal may use the same PRACH preamble, and after receiving a random access response (RAR), the normal terminal may transmit a Msg3 (e.g., PUSCH) including information (hereinafter, 'terminal type indicator') indicating a terminal type (i.e., normal terminal) of itself, and the RedCap terminal may transmit a Msg3 (e.g., PUSCH) including a terminal type indicator indicating a terminal type (i.e., RedCap terminal) of itself. The base station may distinguish between the normal terminal and the RedCap terminal based on the information included in the Msg3. When a Msg2 (i.e., RAR) received from the base station requests transmission of the terminal type indicator, when the base station can recognize RedCap terminal(s), or when the base station provides services for RedCap terminal(s), each of the normal terminal(s) and the RedCap terminal(s) may transmit a Msg3 including the terminal type indicator. When the base station cannot recognize RedCap terminal(s) and/or when the base station does not provide services for RedCap terminal(s), the base station may not interpret the terminal type indicator included in the Msg3.

The request of the terminal type indicator may be transmitted through not only the Msg2 but also at least one of system information (e.g., MIB and/or SIB), an RRC message, a MAC CE, DCI (e.g., DCI scheduling system information), and combinations thereof. Information indicating whether the base station can recognize RedCap terminal(s) and/or information indicating whether the base station provides services for RedCap terminal(s) may be transmitted through at least one of system information (e.g., MIB and/or SIB), RRC message, MAC CE, Msg2 (i.e., RAR), DCI (e.g., DCI for scheduling system information), and combinations thereof.

In the type-2 random access procedure, the terminal may transmit a MsgA composed of a PRACH preamble and a PUSCH. In this case, different PRACH preambles and different ROs may be configured to distinguish the normal terminal(s) from the RedCap terminal(s). The base station may transmit RACH configuration information including configuration information of the PRACH preambles and/or configuration information of the ROs to the terminal(s). When transmitting a MsgA in the type-2 random access procedure, the terminal may transmit a PRACH preamble and a PUSCH associated with the PRACH preamble together. Based on the PRACH preamble configured for each of the normal terminal and the RedCap terminal and the PUSCH associated with the corresponding PRACH preamble, the terminal type of each terminal may be identified. Alternatively, the normal terminal and the RedCap terminal may be distinguished based on the PUSCH of the MsgA. Specifically, the PRACH preamble of the MsgA may be identically configured for the normal terminal and the RedCap terminal, and a MsgA PUSCH resource (i.e., a PUSCH resource of the MsgA) may be configured differently for distinguishing between the normal terminal and the RedCap terminal. That is, the base station may differently configure a MsgA PUSCH resource for the normal terminal and a MsgA PUSCH resource for the RedCap terminal. The MsgA PUSCH resource for the normal terminal may be orthogonal to the MsgA PUSCH resource for the RedCap terminal. Here, the resource of the MsgA PUSCH may be at least one of a time resource, a frequency resource, a code (e.g., a DM-RS sequence having orthogonality), and combinations thereof.

After detecting the MsgA PRACH preamble, the base station may perform a decoding operation on the MsgA PUSCH resource configured for each terminal type. In this case, the reception complexity of the base station may increase. Alternatively, the base station may configure the MsgA PUSCH resource for the normal terminal and the MsgA PUSCH resource for the RedCap terminal to be the same, and the MsgA PUSCH may include a terminal type indicator. In this case, the base station may obtain the MsgA PUSCH by performing decoding on the MsgA PUSCH resource regardless of the terminal type, and based on the terminal type indicator included in the MsgA PUSCH, may distinguish between the normal terminal and the RedCap terminal. Accordingly, the reception complexity of the base station may not increase.

Whether to use the terminal type indicator may be signaled by at least one of system information (e.g., MIB or SIB), RRC message, MAC CE, DCI (e.g., DCI scheduling system information), and combinations thereof. In the type-2 random access procedure, the terminal may transmit a MsgA including a PRACH preamble and a PUSCH to the base station, and when the MsgA is detected and received, the base station may transmit a MsgB to the terminal. When the MsgA PRACH preamble is detected and reception of the MsgA PUSCH fails, the base station may indicate the terminal to re-perform the type-2 random access procedure (e.g., reattempt of the MsgA transmission). Alternatively, the base station may request the terminal to transmit only the PRACH preamble by indicating the terminal to switch from the type-2 random access procedure to the type-1 random access procedure.

When the type-2 random access procedure is switched to the type-1 random access procedure, if the normal terminal and the RedCap terminal are not distinguished by the PRACH preamble configuration, the base station may not be able to distinguish the normal terminal from the RedCap terminal. Therefore, when the normal terminal and the RedCap terminal are distinguished by the MsgA PUSCH in the type-2 random access procedure, if the MsgA reception fails, the type-2 random access procedure may not be switched to the type-1 random access procedure, and may be configured to be continuously performed. That is, the base station may preconfigure prohibition of a fallback to the type-1 random access procedure.

When the normal terminal and the RedCap terminal are distinguished through the Msg3 in the type-1 random access procedure, if the detection and/or reception of the MsgA fails, the type-2 random access procedure may be switched to the type-1 random access procedure, and the base station may distinguish between the normal terminal and the RedCap terminal based on the Msg3. In this case, the base station may determine whether to continue performing the type-2 random access procedure and/or whether to switch from the type-2 random access procedure to the type-1 random access procedure.

An initial UL BWP for the random access procedure may be configured differently for each terminal type (e.g., normal terminal or RedCap terminal). In this case, the base station may distinguish the terminal performing the random access procedure based on the initial UL BWP. The base station may configure initial UL BWPs of the normal terminal and the RedCap terminal differently through system information. The initial UL BWP configured for the normal terminal may be referred to as a 'normal initial UL BWP', and the initial UL BWP configured for the RedCap terminal may be referred to as a 'RedCap initial UL BWP'. The normal terminal may perform a random access procedure in the normal initial UL BWP, and the RedCap terminal may perform a random access procedure in the RedCap initial UL BWP. The base station may identify the type of terminal performing the random access procedure by monitoring each of the normal initial UL BWP and the RedCap initial UL BWP.

The PRACH preamble and RO may be independently configured for each of the normal initial UL BWP and the RedCap initial UL BWP. The PRACH preamble and RO for the normal initial UL BWP may be applied to the RedCap initial UL BWP. However, when the normal initial UL BWP is different from the RedCap initial UL BWP, it may be difficult to apply configuration value(s) (e.g., PRACH preamble and/or RO) for the normal initial UL BWP to the RedCap initial UL BWP. In this case, the number of ROs in the frequency domain may be limited, and parameter(s) other than the number of ROs in the frequency domain may be reused or reinterpreted. For example, the number of ROs in the frequency domain may be limited to one.

Alternatively, an SSB for the normal terminal and an SSB for the RedCap terminal may be configured independently. Each of the normal terminal and the RedCap terminal may perform an initial access procedure (e.g., random access procedure) based on the independently configured SSB. In this case, the base station may distinguish a type of a terminal performing the initial access procedure. The SSB for the normal terminal(s) may be referred to as a normal SSB, and the SSB for the RedCap terminal(s) may be referred to as a RedCap SSB. The base station may transmit the normal SSB and the RedCap SSB, and may support an initial access procedure based on the normal SSB and an initial access procedure based on the RedCap SSB.

In the type-1 random access procedure, the terminal may transmit a PRACH preamble and may receive a Msg2 (i.e., RAR) from the base station through a PDSCH. Scheduling information of the PDSCH may be obtained from a DCI scrambled by a random access (RA)-RNTI. The RA-RNTI may be determined by an RO as shown in Equation 5 below.

$$RA\text{-}RNTI = 1 + s_{id} + 14 \times t_{id} + 14 \times 80 \times f_{id} + 14 \times 80 \times 8 \times ul_{carrier_{id}} \quad \text{[Equation 5]}$$

A range of $S_{id}$ may be defined as $0 \leq s_{id} < 14$, and $s_{id}$ may indicate an index of the first symbol (e.g., the first OFDM symbol) of the RO. A range of $t_{id}$ may be defined as $0 \leq t_{id} < 80$, and $t_{id}$ may indicate an index of the first slot of the RO in a system frame. $t_{id}$ may be determined according to a size of a subcarrier. A range of $f_{id}$ may be defined as $0 \leq f_{id} < 8$, and $f_{id}$ may indicate an RO index in the frequency domain. $ul_{carrier_{id}}$ may indicate a UL carrier through which a PRACH preamble is transmitted. $ul_{carrier_{id}}$ in a normal uplink (NUL) may be set to 0, and $ul_{carrier_{id}}$ in a supplementary uplink (SUL) may be set to 1. Therefore, when a position of the RO for the normal terminal and a position of the RO for the RedCap terminal are the same in the time domain, the normal terminal and the RedCap terminal may use the same RA-RNTI.

Even when the position of the RO of the normal terminal and the position of the RO of the RedCap terminal are configured differently in the frequency domain, since $f_{id}$ is a logical index of the RO in the frequency domain, $f_{id}$ of the normal terminal and $f_{id}$ of the RedCap terminal may have the same value. Therefore, even when the normal terminal and the RedCap terminal transmit different PRACH preambles, the base station may not be able to distinguish the RA-RNTI of the normal terminal and the RA-RNTI of the RedCap terminal. In the type-2 random access procedure, an MSGB-RNTI for reception of the Msg-B may be determined according to a position of the RO in which the PRACH preamble included in the Msg-A is transmitted. For example, the MSGB-RNTI may be determined based on Equation 6 below.

$$MSGB\text{-}RNTI = 1 + s_{id} + 14 \times t_{id} + 14 \times 80 \times f_{id} + 14 \times 80 \times 8 \times ul_{carrier_{id}} + 14 \times 80 \times 8 \times 2 \quad \text{[Equation 6]}$$

Each of $s_{id}$, $t_{id}$, $f_{id}$, and $ul_{carrier_{id}}$ in Equation 6 may be the same as $s_{id}$, $t_{id}$, $f_{id}$, and $ul_{carrier_{id}}$ in Equation 5. In order to distinguish between Equation 5 and Equation 6, $14 \times 80 \times 8 \times 2$ may be added to Equation 6. In order to distinguish the RA-RNTI and MSGB-RNTI of the normal terminal from the RA-RNTI of the RedCap terminal, a separate RA-RNTI for the RedCap terminal may be used. To support this operation, an additional offset may be applied to the RA-RNTI of the normal terminal. For example, the RA-RNTI of the RedCap terminal may be determined based on Equation 7 below. The RA-RNTI of the RedCap terminal may be referred to as an RA-R-RNTI. Equation 7 may be an equation obtained by adding $14 \times 80 \times 8 \times 4$ to Equation 5.

$$RA\text{-}R\text{-}RNTI = 1 + s_{id} + 14 \times t_{id} + 14 \times 80 \times f_{id} + 14 \times 80 \times 8 \times ul_{carrier_{id}} + 14 \times 80 \times 8 \times 4 \quad \text{[Equation 7]}$$

The RA-R-RNTI determined by Equation 7 may not overlap with the RA-RNTI and MSGB-RNTI of the normal terminal. When the RedCap terminal uses one of the type-1 random access procedure and the type-2 random access procedure, the RedCap terminal and/or the base station may use Equation 7 to set the RA-R-RNTI that does not overlap with each of the RA-RNTI and MSGB-RNTI of the normal terminal. When the RedCap terminal supports both the type-1 random access procedure and the type-2 random access procedure, a method for distinguishing the RA-R-RNTI for the type-1 random access procedure and the RA-RNTI (hereinafter referred to as 'MSGB-R-RNTI') of the RedCap terminal for the type-2 random access procedure may be required.

When the RA-R-RNTI for the type-1 random access procedure is set based on Equation 7, the MSGB-R-RNTI for the type-2 random access procedure may be set based on an equation obtained by adding $14 \times 80 \times 8 \times 6$ to Equation 5. In this case, since a range of values for the MSGB-R-RNTI is 62721 to 71680, the value of MSGB-R-RNTI may exceed 65519, which is the maximum value that other RNTIs except for some RNTIs defined for special purposes may have. Therefore, the MSGB-R-RNTI may be difficult to use. In order to solve the above-mentioned problem, a modulo operation may be used to calculate the MSGB-R-RNTI as shown in Equation 8 below.

$$MSGB\text{-}R\text{-}RNTI = (1 + s_{id} + 14 \times t_{id} + 14 \times 80 \times f_{id} + 14 \times 80 \times 8 \times ul_{carrier_{id}} + 14 \times 80 \times 8 \times 6) \bmod 2^{16} \quad \text{[Equation 8]}$$

Equation 8 may be an equation obtained by adding $14 \times 80 \times 8 \times 6$ to Equation 5. A modulo operation may be used so that the value of MSGB-R-RNTI is set within an acceptable value. When a value applied to the modulo operation is set to $2^{16}$, the value of MSG-R-RNTI may be set to a value of a paging (P)-RNTI, system information (SI)-RNTI, or reserved RNTI.

In order to prevent such the problem, the value applied to the modulo operation may be set to 65520 as shown in Equation 9 below.

$$MSGB\text{-}R\text{-}RNTI = (1 + s_{id} + 14 \times t_{id} + 14 \times 80 \times f_{id} + 14 \times 80 \times 8 \times ul_{carrier_{id}} + 14 \times 80 \times 8 \times 6) \bmod 66520 \quad \text{[Equation 9]}$$

In Equations 8 and 9, the modulo operation may be used so that the value of MSG-R-RNTI does not exceed a range of acceptable values. The modulo operation may also be applied to equation(s) other than Equations 8 and 9. Alternatively, the range of $f_{id}$ in the equation(s) for calculating the RNTI may be reduced 1, 2, 4, or 8 ROs may be multiplexed according to configuration in the frequency domain. In this case, the range of $f_{id}$ indicating the RO index may be defined as $0 \leq f_{id} < 8$. The number of RedCap terminals within a cell may be smaller than the number of normal terminals. Therefore, the number of ROs multiplexed for the RedCap terminal(s) in the frequency domain may be limited to be less than 8. For example, the maximum value of $f_{id}$ for the RedCap terminal(s) may be equal to or less than 8. The maximum value of $f_{id}$ may be referred to as $f_{id_{max}}$. In this case, the RA-R-RNTI may be determined based on Equation 10 below, and the MSGB-R-RNTI may be determined based on Equation 11 below.

$$RA\text{-}R\text{-}RNTI = 1 + s_{id} + 14 \times t_{id} + 14 \times 80 \times f_{id} + 14 \times 80 \times f_{id_{max}} \times ul_{carrier_{id}} 14 \times 80 \times 8 \times 4 \quad \text{[Equation 10]}$$

$$MSGB\text{-}R\text{-}RNTI = 1 + s_{id} + 14 \times t_{id} + 14 \times 80 \times f_{id} + 14 \times 80 \times f_{id_{max}} \times ul_{carrier_{id}} + 14 \times 80 \times 8 \times 4 + 14 \times 80 \times f_{id_{max}} \times 2 \quad \text{[Equation 11]}$$

Equation 10 may be an equation for calculating the RA-R-RNTI for the RedCap terminal in the type-1 random access procedure. Equation 11 may be an equation for calculating the MSGB-R-RNTI for the RedCap terminal in the type-2 random access procedure. When Equations 10 and 11 are used, the RA-R-RNTI and MSGB-R-RNTI for the RedCap terminal may not overlap with the RA-RNTI and MSGB-RNTI for the normal terminal.

TABLE 5

| Start value | End value | RNTI | UL carrier | Terminal type |
|---|---|---|---|---|
| 1 | 8960 | RA-RNTI | NUL | Normal terminal |
| 8961 | 17920 | RA-RNTI | SUL | Normal terminal |
| 17921 | 26880 | MSGB-RNTI | NUL | Normal terminal |
| 26881 | 35840 | MSGB-RNTI | SUL | Normal terminal |
| 35841 | 40320 | RA-R-RNTI | NUL | RedCap terminal |
| 40321 | 44800 | RA-R-RNTI | SUL | RedCap terminal |
| 44801 | 49280 | MSGB-R-RNTI | NUL | RedCap terminal |
| 49281 | 53760 | MSGB-R-RNTI | SUL | RedCap terminal |

Table 5 shows the RA-RNTI and MSGB-RNTI for the normal terminal, and the RA-R-RNTI and MSGB-R-RNTI for the RedCap terminal, which are calculated by Equation 5, Equation 6, Equation 10, and Equation 11. In Table 5, the RA-R-RNTI and MSGB-R-RNTI may be calculated results according to a limitation of '$f_{id_{max}} = 4$'. That is, $f_{id_{max}}$ may be reduced from 8 to 4. The RNTIs may be set not to overlap with each other. Also, the RNTIs may be set not to exceed the maximum value of 65519. The above-described exemplary embodiment may be applied when at least one of the type-1 random access procedure and the type-2 random access procedure is supported. Even when one of the type-1 random access procedure and the type-2 random access procedure is supported, the RNTI may be calculated according to the limitation of $f_{id_{max}}$. The above-described exemplary embodiment may be applied even when $f_{id_{max}}$ is set (e.g., decreased) to a value other than 4. In the calculation procedure of the RNTI, not only $f_{id}$ but also sid and/or $t_{id}$ may be limited. sid may indicate the first symbol index of the RO, and $t_{id}$ may indicate the first slot index of the RO in the system frame. The RNTI may be calculated by a combination of the above-described methods. The RA-RNTI for the RedCap terminal may be referred to as another term (e.g., RA-RNTI) instead of the RA-R-RNTI. The RA-RNTI may be equally used for the normal terminal and the RedCap terminal. The MSGB-RNTI for the RedCap terminal may be referred to as another term (e.g., MSGB-RNTI) instead of the MSGB-R-RNTI. The MSGB-RNTI may be used equally for the normal terminal and the RedCap terminal.

A type1-PDCCH CSS set in which a DCI for scheduling an RAR (hereinafter, referred to as 'RAR scheduling DCI') is received may be independently configured for each of the RedCap terminal and the normal terminal. In exemplary embodiments, the type1-PDCCH CSS set for the RedCap terminal may be referred to as a 'RedCap type1-PDCCH CSS set', and the type1-PDCCH CSS set for the normal terminal may be referred to as a 'normal type1-PDCCH CSS set'. The normal terminal may monitor an RAR scheduling DCI scrambled by the RA-RNTI or MSGB-RNTI in the normal type1-PDCCH CSS set, and the RedCap terminal may monitor an RAR scheduling DCI scrambled by the RA-R-RNTI or MSGB-R-RNTI in the RedCap type1-PDCCH CSS set. Therefore, even when the same RNTI is configured for the normal terminal and the RedCap terminal, each of the normal terminal and the RedCap terminal may successfully receive the RAR scheduling DCI. In the time and/or frequency domain, the normal type1-PDCCH CSS set may not overlap with the RedCap type1-PDCCH CSS set. The normal type1-PDCCH CSS set and the RedCap type1-PDCCH CSS set may be configured in different slots. Alternatively, the normal type1-PDCCH CSS set and the RedCap type1-PDCCH CSS set may be configured in different symbols within the same slot.

A CSS set may be configured within three symbols in a slot. The three symbols in which the CSS set is configured may be located in a front region (e.g., symbols from the first symbol to the third symbol) or an arbitrary region within the slot. The RedCap type1-PDCCH CSS set may be configured in any symbol(s) in the slot to improve the efficiency of resource use, so that the normal terminal and the RedCap terminal are monitored together within one slot according to a limited bandwidth. In order to distinguish the RAR scheduling DCI even when the RNTIs of the RedCap terminal and the normal terminal are set identically, an RAR window of the RedCap terminal (hereinafter, referred to as 'RedCap RAR window') may be configured differently from an RAR window of the normal terminal (hereinafter, referred to as 'normal RAR window'). The normal RAR window may start from the first symbol of the earliest CORESET in which the type1-PDCCH CSS set is configured after an RO in which a PRACH preamble is transmitted. The normal RAR window may be configured in units of slots.

When the same $f_{id}$ is used in the equation for calculating the RA-RNTI, the RA-RNTI of the normal terminal may be the same as the RA-RNTI of the RedCap terminal. When the RA-RNTI of the normal terminal is the same as the RA-RNTI of the RedCap terminal, a starting time of the normal RAR window may be the same as a starting time of the RedCap RAR window. In order to solve the above problem, the RedCap RAR window may be configured separately from the normal RAR window. When the RedCap RAR window and the normal RAR window are configured to be distinguished, the RedCap RAR window may be configured after the normal RAR window in the time domain. In order to prevent overlap between the RedCap RAR window and the normal RAR window starting after the RO, the size (e.g., length) of the RedCap RAR window may be determined in consideration of an offset from the corresponding RO. In addition, the starting time of the RedCap RAR window may be determined in consideration of the offset from the corresponding RO.

In order to support the above-described operation(s), the base station may transmit a signaling message including information on the offset and/or size of the RAR window (e.g., RedCap RAR window and/or normal RAR window) to the terminal(s). In this case, in order to reduce signaling overhead, the RedCap RAR window may be configured continuously with the normal RAR window in the time domain. The size of the RedCap RAR window may be configured to the RedCap terminal, and the starting time of the RedCap RAR window may be implicitly indicated to the RedCap terminal. For example, the RedCap terminal may configure the RedCap RAR window from an ending time of the normal RAR window. In this case, the normal RAR window and the RedCap RAR window may be configured consecutively. Alternatively, the size of the RedCap RAR window may be implicitly indicated. For example, the size of the RedCap RAR window may be assumed to be the same as the size of the normal RAR window. In this case, the RedCap terminal may determine that the size of the RedCap RAR window is the same as the size of the normal RAR window, and may start the RedCap RAR window at the ending time of the normal RAR window. Accordingly, the signaling overhead can be reduced.

If the base station can distinguish the normal terminal from the RedCap terminal at an early time of the initial access procedure, the initial access procedure of the RedCap terminal may be restricted according to a situation of the communication system. When traffic processing is difficult due to the increase in the number of terminals in the base station, the base station may block the initial access procedure of the RedCap terminal to temporarily suspend services to the RedCap terminal(s), and may provide preferential services to the normal terminals. In the present disclosure, a method of blocking the access attempt(s) of the RedCap terminal(s) in the initial access procedure will be proposed.

A terminal may receive an SSB, and may obtain configuration information of the CORESET #0 and configuration information of the type0-PDCCH CSS set for receiving system information (e.g., RMSI) from a PBCH included in the SSB. By configuring frequency resources of the CORESET #0 to be larger than a bandwidth supported by the RedCap terminal, the initial access procedure of the RedCap terminal(s) may be blocked in advance. The bandwidth supported by the RedCap terminal may be configured to be smaller than the bandwidth of the normal terminal(s). The base station may block the initial access procedure of the RedCap terminal(s) in advance by configuring the frequency resources of the CORESET #0 to be larger than the bandwidth supported by the RedCap terminal. If the frequency resources of the CORESET #0 is configured to be larger than the bandwidth supported by the RedCap terminal, the RedCap terminal may determine that access to the corresponding base station is impossible, and may find a new base station.

Alternatively, the base station may block the initial access procedure of the RedCap terminal(s) by using a DCI scheduling SIB1 (hereinafter, referred to as 'SIB1 DCI'). Among the reserved bits included in the DCI format 1_0 scrambled by the SI-RNTI (e.g., SIB1 DCI), one bit may be used as an indicator for access restriction of the RedCap terminal. The normal terminal (e.g., legacy terminal) may receive the SIB1 based on conventional scheduling information because it does not consider the reserved bits included in the DCI format 1_0. The RedCap terminal may determine whether the access of the RedCap terminal is restricted or not based on the indicator included in the DCI format 1_0. When the access of the RedCap terminal is not restricted, the RedCap terminal may receive the SIB1 based on the scheduling information. When the access of the RedCap terminal is restricted, the RedCap terminal may not receive the SIB1.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a base station in a communication system, the operation method comprising:
   generating first information of a first physical random access channel (PRACH) preamble for a normal terminal;
   generating second information of a second PRACH preamble for a reduced capability (RedCap) terminal;
   transmitting random access channel (RACH) configuration information including the first information and the second information; and
   performing a random access procedure with a first terminal,
   wherein the performing of the random access procedure comprises:
   receiving a Msg1 based on at least one of the first information or the second information from the first terminal;
   transmitting a Msg2 to the first terminal in response to the Msg1; and
   receiving a Msg3 including information used for indicating a terminal type of the first terminal from the first terminal, and
   wherein the terminal type of the first terminal is identified as the normal terminal or the RedCap terminal based on the information included in the Msg3.

2. The operation method according to claim 1, wherein the terminal type is identified based on a type of a PRACH preamble received in the random access procedure, and the type of the PRACH preamble is the first PRACH preamble or the second PRACH preamble.

3. The operation method according to claim 1, wherein the RACH configuration information includes configuration information of a first RACH occasion (RO) for the normal terminal and configuration information of a second RO for the RedCap terminal, the terminal type is identified based on a type of an RO in which a PRACH preamble is received in the random access procedure, and the type of the RO is the first RO or the second RO.

4. The operation method according to claim 1, wherein information for enabling or disabling an operation of distinguishing the normal terminal from the RedCap terminal based on the first information and the second information is included in the RACH configuration information.

5. The operation method according to claim 1, wherein information indicating whether at least one of a type-1 random access procedure or a type-2 random access procedure is supported is included in the RACH configuration information.

6. The operation method according to claim 1, wherein information for enabling or disabling an operation of distinguishing the normal terminal from the RedCap terminal based on the information used for indicating the terminal type is included in the RACH configuration information.

7. A base station in a communication system, the base station comprising:
a processor;
a memory electronically communicating with the processor;
instructions stored in the memory,
wherein when executed by the processor, the instructions cause the base station to:
generate first information of a first physical random access channel (PRACH) preamble for a normal terminal;
generate second information of a second PRACH preamble for a reduced capability (RedCap) terminal;
transmit random access channel (RACH) configuration information including the first information and the second information; and
perform a random access procedure with a first terminal, wherein in the performing of the random access procedure, the instructions cause the base station to:
receive a MsgA including a PRACH preamble and a physical uplink shared channel (PUSCH) including information used for indicating a terminal type of the first terminal based on at least one of the first information or the second information from the first terminal, and
wherein the terminal type of the first terminal is identified as the normal terminal or the RedCap terminal based on the information included in the PUSCH.

8. The base station according to claim 7, wherein the terminal type is identified based on a type of a PRACH preamble received in the random access procedure, and the type of the PRACH preamble is the first PRACH preamble or the second PRACH preamble.

9. The base station according to claim 7, wherein the RACH configuration information includes configuration information of a first RACH occasion (RO) for the normal terminal and configuration information of a second RO for the RedCap terminal, the terminal type is identified based on a type of an RO in which a PRACH preamble is received in the random access procedure, and the type of the RO is the first RO or the second RO.

10. The base station according to claim 7, wherein the terminal type is identified as the normal terminal or the RedCap terminal based on a transmission resource of the PUSCH.

* * * * *